United States Patent
Mori et al.

(10) Patent No.: US 7,472,250 B2
(45) Date of Patent: Dec. 30, 2008

(54) STORAGE CONTROL DEVICE, AND CONTROL METHOD FOR STORAGE CONTROL DEVICE

(75) Inventors: Hajime Mori, Yokohama (JP); Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 353 days.

(21) Appl. No.: 11/448,950

(22) Filed: Jun. 6, 2006

(65) Prior Publication Data
US 2007/0233944 A1 Oct. 4, 2007

(30) Foreign Application Priority Data
Mar. 28, 2006 (JP) ............... 2006-087513

(51) Int. Cl.
*G06F 12/06* (2006.01)
(52) U.S. Cl. ............... 711/201; 710/66; 711/112; 711/171
(58) Field of Classification Search ........... 710/66; 711/112, 171, 201
See application file for complete search history.

(56) References Cited

U.S. PATENT DOCUMENTS

| | | | |
|---|---|---|---|
| 4,809,273 A | 2/1989 | Jackowski et al. | |
| 5,706,298 A | 1/1998 | Sandorfi | |
| 5,742,934 A | 4/1998 | Shinohara | |
| 5,819,054 A | 10/1998 | Ninomiya et al. | |
| 6,751,757 B2 | 6/2004 | Biskup et al. | |
| 6,952,797 B1 | 10/2005 | Kahn et al. | |
| 7,346,732 B2 | 3/2008 | Yagisawa et al. | |
| 2004/0139260 A1 | 7/2004 | Steinmetz et al. | |
| 2004/0148460 A1 | 7/2004 | Steinmetz et al. | |
| 2004/0148461 A1 | 7/2004 | Steinmetz et al. | |
| 2005/0204078 A1 | 9/2005 | Steinmetz et al. | |

FOREIGN PATENT DOCUMENTS

JP 2000-347815 12/2000

OTHER PUBLICATIONS

Patterson, David A., et al., "A Case for Redundant Arrays of Inexpensive Disks (RAID)," Association for Computing Machinery, 1988, pp. 109-116, Berkeley, CA.

*Primary Examiner*—Sanjiv Shah
*Assistant Examiner*—Jae U Yu
(74) *Attorney, Agent, or Firm*—Sughrue Mion, PLLC

(57) ABSTRACT

The storage control device of the present invention is able to perform input and output of data between blocks whose size is different with good efficiency. The size of extended logical blocks, which are units of data input and output within a storage control device, and the size of physical blocks, which are provided within the storage device, are different from one another. A write object range generation unit reads out both of the extended logical blocks which are adjacent to the write data, and creates a write object range by linking them to the write data. An assurance code checking unit checks a corresponding assurance code for each of these extended logical blocks. And a block size adjustment unit deletes superfluous data from the adjacent blocks, and adjusts the size of the write object range, so that it becomes an integral multiple of the size of the physical blocks.

12 Claims, 18 Drawing Sheets

STORAGE CONTROL DEVICE, AND CONTROL METHOD FOR STORAGE CONTROL DEVICE

CROSS-REFERENCE TO RELATED APPLICATION

This application relates to and claims priority from Japanese Patent Application No. 2006-87513 filed on Mar. 28, 2006, the entire disclosure of which is incorporated herein by reference.

BACKGROUND OF THE INVENTION

1. Field of the Invention

The present invention relates to a storage control device and to a control method for a storage control device, and, more particularly, relates to a storage control device and a control method for a storage control device, which, for example, can perform data input and output to and from a storage device for which the management unit for data input and output is different.

2. Description of the Related Art

A disk array system is per se known as one type of storage system which is connected to a host computer (hereinafter termed a "host") such as a server or a mainframe machine. Such a disk array system is sometimes also termed a RAID (Redundant Array of Inexpensive Disks) system, and it comprises a plurality of disk drives which are arranged in the form of an array, and a control unit which controls them.

In such a disk array system, by operating the plurality of disk drives in parallel, it is possible to perform processing of read requests and write requests for data at high speed. Furthermore, with such a disk array system, it is also possible to add redundancy for the data, as is per se known as RAID1 through RAID5 (refer to "A Case for Redundant Arrays of Inexpensive Disks (RAID)", by D. Patterson & two others, ACM SIGMOD Conference Proceedings, June 1988, pp. 109-116).

Thus, with such a disk array system, redundant data is generated in order to be able to restore the data even if some problem has occurred with one of the disk drives; and this redundant data different from the data is stored on a disk drive.

In addition to such a RAID structure, there are per se known disk array systems which employ security codes (refer to Japanese Patent Laid-Open Publication 2000-347815, U.S. Pat. Nos. 5,819,054, and 5,706,298). In one such prior art technique, the logical address of the logical block which the host computer designates as the destination for access (hereinafter termed the "LA" (Logical Address)), and an LRC (Longitudinal Redundancy Check) which is obtained by performing a calculation of the exclusive logical sum of the data in the logical block, are appended to the logical block as an assurance code, and this assurance code and the logical block are stored on the disk drive. The LA is used in order to detect an error in the address of the storage region into which the data of the logical block is written. And the LRC is used as an error detection code in order to detect an error in the data of the logical block.

With this prior art technique, it is possible to anticipate an enhancement of the reliability of the storage system by the use of such a RAID structure and assurance codes. However, in the case of using, as the storage system, a recording medium whose block length (sector length) is fixed, such as, for example, an ATA (AT Attachment) disk or the like, there is a possibility that the data unit when the control unit of the storage system is inputting and outputting data to and from the recording medium, and the data unit when the recording medium is performing input and output processing of data, are different. In such a case, a difficulty occurs with regard to inputting and outputting data to and from the recording medium.

It should be understood that, even if the data unit which is used by the recording medium is not fixed, the same problem as described above can occur, if the data unit when the control unit is performing input and output processing of data to and from the recording medium, and the data unit which is used by the recording medium, cannot be of the same size.

Furthermore, even if the size of a logical block, which is the unit when the host is handling data, and the sector length of the disk drive, agree with one another, the same problem as described above can occur, if the control unit of the storage system appends an assurance code to a logical block which is received from the host. With a storage system which employs an assurance code, the object which is written to the disk drive is the combination of the logical block and the assurance code. Accordingly, the size of the data item which is written to the disk drive, and the sector length of the disk drive, finally do not agree with one another.

As described above, it is difficult to record a logical block to which an assurance code has been appended, in a sector of a different size, just as it is without alteration. However, since, by checking the assurance code, it is possible to detect an error in the contents of the data and an error in the destination for writing the data, accordingly there is a great demand for the development of a technique for enabling input and output, in a simple and easy manner, of logical blocks to which assurance codes have been appended, to and from a recording medium which has a different sector length.

SUMMARY OF THE INVENTION

The present invention has been conceived in the light of the above described problems, and a primary object thereof is to provide a storage control device, and a control method for a storage control device, which are so arranged as to be able to perform input and output of data in an efficient manner, even if the size of a first block which is used for data and input and output processing within the storage control device, and the size of a plurality of second blocks which are provided within a storage device, are different from one another. Another objective of the present invention is to provide a storage control device, and a control method for a storage control device, which are so arranged as to be able to enhance reliability by employing an assurance code, even if a data management unit which is used for data input and output processing within the storage control device, and a management unit for data which is stored within a storage device, are different from one another. Yet further objectives of the present invention will become clear from the preferred embodiments thereof which will be described hereinafter.

In order to solve the above described problems, with the storage control device according to the present invention, if the data management unit for data input and output processing within the storage control device and the management unit for data stored in the storage device are different, after the data of the range of the write object has been increased in size up to both ends of the write data, it is compressed so as to agree with the data management units within the storage device.

In other words, the storage control device according to one aspect of the present invention is a storage control device for controlling data input and output between a host device and a storage device, wherein the size of a first block which is used in data input and output processing within the storage control device, and the size of a plurality of second blocks which are provided within the storage device, are different from one another, the storage control device including: a linked data generation unit which generates linked data by, if either one end or the other end of the write data in the first block units does not coincide with a boundary between the second blocks, acquiring the data of another first block which is contiguous with the non-coincident end portion, and linking the data of this other first block to the write data; a data size adjustment unit which adjusts the size of the linked data to an integral multiple of the size of the second blocks by deleting a portion of the data of the other first block, so that the end portion of the data of the other first block which has been linked to the write data coincides with a boundary between the second blocks; and a writing unit which writes the linked data whose size has been adjusted into the storage device.

Moreover, the storage control device according to another aspect of the present invention is a storage control device for controlling data input and output between a host device and a storage device, wherein the size of a first block which is used in data input and output processing within the storage control device, and the size of a plurality of second blocks which are provided within the storage device, are different from one another, the storage control device including: a write data reception unit which, according to a request from the host device, receives write data from the host device; a reading out unit which reads out data from the storage device; an assurance code setting unit which, for the write data which has been received, converts the write data to write data in the first block units by setting a respective assurance code for guaranteeing data contents, for each item of data of the size of the second blocks; a cache memory which stores the write data in the first block units; a linked data generation unit which generates linked data by, if either one end or the other end of the write data stored in the cache memory does not coincide with a boundary between the second blocks, acquiring from the storage device via the reading out unit the data of another first block which is contiguous with the non-coincident end portion, and linking the data of the other first block which has been acquired to the write data; a checking unit which checks whether or not the contents of the linked data are normal, based on the assurance codes which are included in the linked data; a data size adjustment unit which, if a check result of normality has been obtained by the checking unit, adjusts the size of the linked data to an integral multiple of the second size by deleting a portion of the data of the other first block, so that the end portion of the data of the other first block which has been linked to the write data coincides with a boundary between the second blocks; and a writing unit which writes the linked data whose size has been adjusted into the storage device.

In an embodiment of the present invention, a redundant storage structure which uses redundant data is provided by the storage device, the storage control device further comprising a redundant data generation unit which generates redundant data in the first block units with regard to the write data which has been received; and wherein the linked data generation unit, the checking unit, the data size adjustment unit, and the writing unit process the redundant data in the same manner as the write data.

In another embodiment of the present invention, a redundant storage structure which uses redundant data is provided by the storage device, the storage control device further comprising a redundant data generation unit which generates redundant data in the first block units with regard to the write data which has been received; and wherein the linked data generation unit, the checking unit, the data size adjustment unit, and the writing unit process the redundant data in the same manner as the write data, and moreover the reading out unit is formed to read out data from the storage device of a size which is the least common multiple of the size of the first block and the size of the second blocks.

In yet another embodiment of the present invention, a redundant storage structure which uses redundant data is provided by the storage device, and there is further included a redundant data generation unit which generates redundant data in the first block units with regard to the write data which has been received; and wherein the linked data generation unit, the checking unit, the data size adjustment unit, and the writing unit process the redundant data in the same manner as the write data, and there is further included: an old data reading out unit which, before the linked data generation unit generates the linked data, reads out in advance from the storage device each of the old data, in the first block units, which is updated by the write data and another first block data which is contiguous to the old data, and stores the data in the cache memory; and an old redundant data reading out unit which, before the linked data generation unit generates the linked data related to the new redundant data, reads out in advance from the storage device each of the old redundant data, in the first block units, which is updated by the new redundant data and another first block data which is contiguous to the old redundant data, and stores the data in the cache memory.

In still another embodiment of the present invention, there is further included a cache controller which controls data input and output to and from the cache memory, and the assurance code setting unit, the checking unit, and the data size adjustment unit are provided within the cache controller respectively.

In even another embodiment of the present invention, there is further included a micro processor which controls data input and output processing, and the assurance code setting unit, the checking unit, the linked data generation unit, and the data size adjustment unit are implemented by the micro processor respectively.

In a further embodiment of the present invention, an error detection symbol for detecting an error, for each second sized data item, is included in the assurance code.

In yet a further embodiment of the present invention, address information for detecting an error of the write address, for each second sized data item, is included in the assurance code.

In still yet another embodiment of the present invention, an error detection symbol for detecting an error, for each second sized data item, and address information for detecting an error of the write address, for each second sized data item are included in the assurance code.

And the control method for a storage control device according to another aspect of the present invention is a method for controlling a storage control device which performs data input and output between a host device and a storage device, wherein the size of a first block which is used in data input and output processing within the storage control device, and the size of a plurality of second blocks which are provided within the storage device, are different from one another, the control device executing: a write data reception step of storing write data which has been received from the host device in a cache memory; an adjacent block acquisition step of deciding whether or not either one end or the other end of the write data which has been stored in the cache memory does not coincide with a boundary between the second blocks, and, if not coincided, acquiring from the storage device the data of another first block which is adjacent to and contiguous to the non-coincident end portion; a linked data generation step of generating linked data by linking the adjacent block which has been acquired to the write data; a data size adjustment step of adjusting the size of the linked data to an integral multiple of the second size by deleting a portion of the data of the other first block, so that the end portion of the data of the other first block which has been linked to the write data coincides with a boundary between the second blocks; and a writing step of writing the linked data whose size has been adjusted into the storage device.

Furthermore, there may be included an assurance code setting step between the write data reception step and the adjacent block acquisition step, and a checking step between the linked data generation step and the data size adjustment step, wherein: in the assurance code setting step, for the write data which has been received, the write data is converted to write data of the first block units by setting a respective assurance code for guaranteeing data contents for each item of data of the size of the second block; and, in the checking step, whether or not the contents of the linked data are normal is checked, based on the assurance codes which are included in the linked data.

All or at least a part of each of the steps of the present invention may be implemented as a computer program. Such a computer program may be distributed by being fixed on a recording medium, or may also be distributed via a network.

DESCRIPTION OF THE PREFERRED EMBODIMENTS

Figure 1:
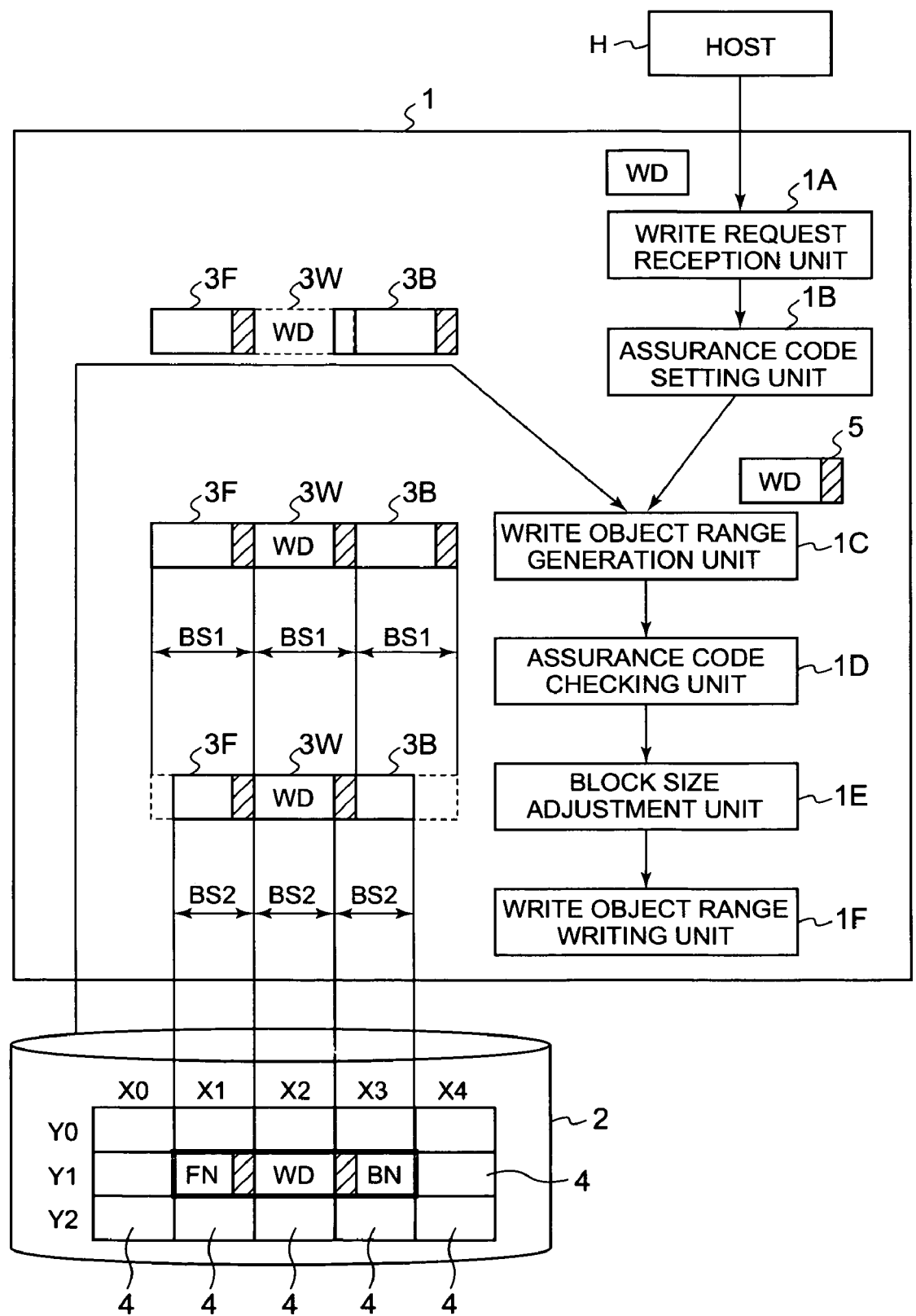
FIG. 1 is an explanatory figure showing the overall concept of the present invention.

In the following, embodiments of the present invention will be explained with reference to the drawings. First, initially, the concept of the present invention will be explained, and next concrete embodiments thereof will be explained. FIG. 1 is an explanatory figure which schematically shows the concept of the present invention.

A storage system may, for example, comprise a storage control device 1 and a storage device 2. According to read requests and write requests which are issued from a host H, the storage control device 1 reads out data from the storage device 2, and writes data into the storage device 2. The storage device 2, for example, may comprise at least one or more storage devices such as hard disk drives or the like, on which is stored data which is used by the host H.

Here, the data management unit when data is being handled in the interior of the storage control device 1 and the management unit for data which is stored within the storage device 2 are different from one another. The storage control device 1 may, for example, be arranged to perform its data input and output processing by using extended logical blocks 3 which have a size BS1 of 520 bytes.

These extended logical blocks are blocks which are generated by, for example, appending assurance codes 5 of eight bytes to logical blocks having a size BS2 of 512 bytes. These logical blocks are the data input and output units when the host H is using the storage device 2. The assurance code 5 is a code which is generated and appended to each of the logical blocks: for example, it may include information (LRC) for detecting an error in the contents of the logical block and information (LA) for detecting an error in the write destination of the logical block, or the like.

This assurance code 5 may, for example, include both an LRC and an LA, or may include only one of an LRC and an LA. It should be understood that this LRC and LA are cited as examples of information which may be included in the assurance code, and it would also be acceptable to include other information similar to an LRC and an LA, or to include other information which is different from an LRC and an LA.

By contrast to the storage control device 1 which uses extended logical blocks 3 of 520 bytes, data is inputted and outputted by the storage device 2 in units of physical blocks 4 which have a size BS2 of, for example, 512 bytes. These physical blocks 4 may be considered as "sectors" which are provided on a recording medium such as, for example, a hard disk, a flexible disk, an optical disk, or the like. In this manner, the size of the logical blocks which are used between the host H and the storage control device 1, and the size of the physical blocks 4 which are managed within the storage device 2, do not agree with one another. To put it in another manner, in this embodiment, the data management units within the storage control device 1 (the extended logical blocks 3) and the data management units within the storage device 2 (the physical blocks 4) do not agree with one another, since the assurance codes 5 are appended within the storage control device 1.

The data processing function with which the storage control device 1 is endowed will now be explained. The storage control device 1, for example, may comprise a write request reception unit 1A, an assurance code setting unit 1B, a write object range generation unit 1C, an assurance code checking unit 1D, a block side adjustment unit 1E, and a write object range writing unit 1F.

The write request reception unit 1A is a device for receiving a write request which has been issued from the host H. When this write request reception unit 1A receives a write request from the host H, it reserves a region in a cache memory for storing the write data WD, and stores the write data WD which it has received from the host H in the cache memory. Here, the write data WD may consist of one or a plurality of logical blocks.

The assurance code setting unit 1B is a device for creating an assurance code 5 for each of the logical blocks of the write data WD, and for appending these assurance codes to their respective logical blocks. By appending these assurance codes to the logical blocks, an extended logical block 3 is generated whose size is larger than that of the original logical block (extended logical block=logical block+assurance code). By doing this, the write data WD becomes one constituent of the write data 3W which is made up by the extended logical block unit (write data 3W=write data WD+assurance code 5).

The write object range generation unit 1C corresponds to the "linked data generation unit" of the Claims. This write object range generation unit 1C generates a write object range by enlarging the write data 3W which has been built up as data of the extended block unit, by extending it up to both its ends.

This write object range generation unit 1C acquires, from within the storage device 2, the other extended logical blocks 3F and 3B which continue on adjacent to both the ends of the write data 3W of the extended block unit, and links these extended logical blocks 3F and 3B with the write data 3W. By doing this, the write object range (the linked data) is generated. Sometimes, in the following explanation, these extended logical blocks 3F and 3B will be termed the adjacent blocks 3F and 3B.

The one 3F of these adjacent blocks is that extended logical block which is adjacent to the head end side of the write data 3W. And the other one 3B of these adjacent blocks is that extended logical block which is adjacent to the tail end side of the write data 3W.

The storage control device 1 ascertains the correspondence relationship between the physical blocks 4 within the storage device 2 and the extended logical blocks 3 which are managed by the storage control device 1. Accordingly, the write object range generation unit 1C reads out from within the storage device 2 the physical blocks 4 in which the data of the adjacent blocks 3F and 3B is stored, and acquires, from within these physical blocks 4 which have been read out, the data of each of the adjacent blocks 3F and 3B.

By arranging the adjacent block 3F of the head end side at the head end side of the write data 3W, and by arranging the adjacent block 3B of the tail end side at the tail end side of the write data 3W, the range of data which constitutes the object to be written into the storage device 2 is enlarged both in the forwards direction and in the rearwards direction of the write data 3W.

As will be described hereinafter in the description of the embodiments, the present invention is not necessarily limited to always reading out both of the two adjacent blocks 3F and 3B from the storage device 2 and linking them to the write data 3W. Only if either one of the end portions at the head end side or at the tail end side of the write data 3W which has been re-structured as the extended logical block unit does not agree with a boundary between physical blocks 4, then the extended logical block (3F or 3B) which is adjacent to and continues from this end portion at which they disagree is acquired, and is linked with the write data 3W.

To put this in another manner, if the head end side or the tail end side of the write data 3W which consists of one or a plurality of extended logical blocks coincides with a boundary between physical blocks 4, then the extended logical block which is adjacent to and continues on from this coincident end portion is not acquired from the storage device 2.

The assurance code checking unit 1D checks the assurance codes 5 included in the write object range (=3F+3W+3B). By doing this it is possible to detect, for each of the extended logical blocks of the data range write object, whether or not there is any error in its contents, and whether or not there is any error in its write destination address. In the example shown in FIG. 1, for each of the extended logical blocks 3F, 3W, and 3B, the assurance code which is appended to that block is checked.

The block size adjustment unit 1E is a device for adjusting the size of the data range write object in agreement with the management units of the storage device 2, which is the write destination device. For a write object range which passes the check by the assurance code checking unit 1D, this block size adjustment unit 1E adjusts the size of the write object range to an integral multiple of the size of the physical blocks 4 by deleting a part of the data which is positioned at either one or at both of its ends.

In the example shown in FIG. 1, for the adjacent block 3F at the head end side, the portion of the data which projects to the outside from the boundary between physical blocks 4 is truncated and thrown away. In the same manner, for the adjacent block 3B at the tail end side, the portion of the data which projects to the outside from the boundary between physical blocks 4 is also truncated and thrown away. It should be understood that partial deletion of the data is not performed for the write data 3W which has been re-structured in extended block units. Only the data (3F, 3B) which has been linked to both sides of the write data 3W is subjected to partial deletion.

The size of the write object range becomes N×BS2. Here, N is a positive integer. For example, when the number of logical blocks included in the write data 3W is N1, and the number of adjacent blocks which are connected to the write data 3W is N2, then N may be expressed as N1+N2 (N=N1+N2).

The write object range writing unit 1F is a device which writes the data range write object of which the block size has been adjusted in a predetermined location of the storage device 2.

In this manner, with this embodiment, even if the size BS1 of the extended logical block 3, which is the unit for data input and output within the storage control device 1, and the size BS2 of the physical blocks 4 which are provided within the storage device 2 are different from one another, it is possible to adjust the size of the data which constitutes the write object range to agree with the size of the physical blocks 4, and to write it in the storage device 2.

Furthermore, with this embodiment, the write object range is generated by reading out the extended logical blocks 3F, 3B which are adjacent to the write data 3W, and, by linking them to the write data 3W. Accordingly, it is possible to store each of the extended logical blocks 3F, 3W, and 3B in the storage device 2 after having checked its respective assurance code 5, so that the reliability is enhanced. In the following, specific embodiments of the present invention will be described in detail.

Embodiment 1

Figure 2:
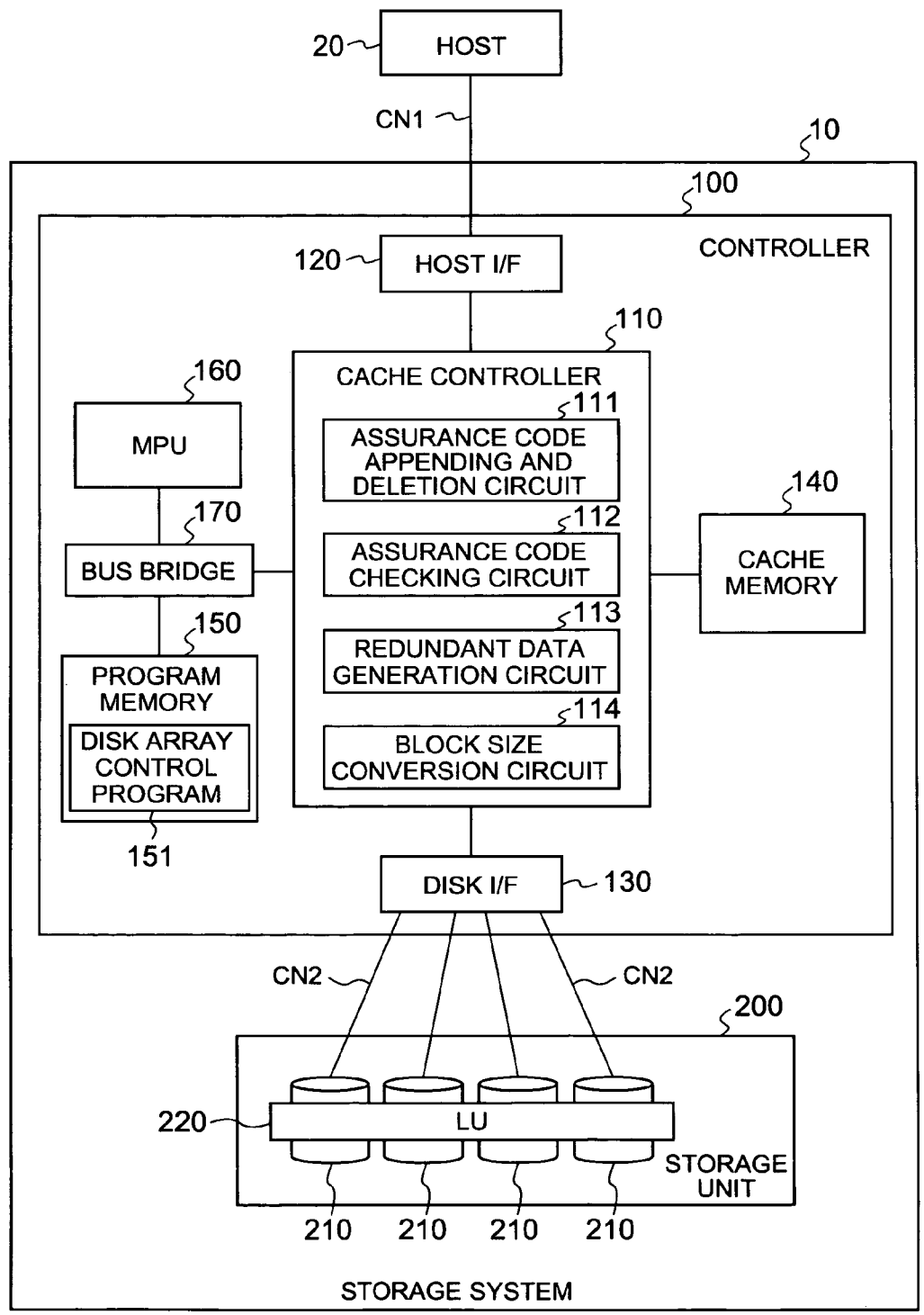
FIG. 2 is a block diagram showing the overall structure of a storage system according to an embodiment of the present invention.

FIG. 2 is an explanatory figure showing the overall structure of a storage system 10 according to this first embodiment. This storage system 10 comprises, for example, a controller 100 and a storage unit 200. The storage system 10 supplies a storage region to a host 20, which may be made redundant, for example as in RAID1~RAID6. However, it should be understood that the present invention may also be applied to a storage system 10 which supplies a storage region which has not been made redundant. The range of the present invention is not to be considered as being limited by the structure of the storage system 10 as hereinafter described. The storage system 10 may have various different formats other than the one shown in FIG. 2.

(1) System Structure

The host 20 may be a computer such as, for example, a server computer or a mainframe computer or the like. This host 20 is connected to the storage system 10 via a communication path CN1 such as, for example, a LAN (Local Area Network) or a SAN (Storage Area Network) or the like. For the convenience of explanation, only one host 20 is shown in the figure, but it would also be acceptable to arrange for a plurality of such hosts 20 to be connected to the storage system 10.

The storage system 10 stores data which is used by the host 20 in the storage unit 200. Input and output of data to and from the storage unit 200 (i.e. reading out of data and writing in of data) is controlled by a controller 100.

This controller 100 comprises, for example, a cache controller 110, a host communication unit 120 (hereinafter termed the "host I/F 120"), a disk communication unit 130 (hereinafter termed the "disk I/F 130"), a cache memory 140, a program memory 150, a micro processor 160 (hereinafter termed the "MPU 160"), and a bus bridge 170. It should be understood that this structure for the controller 100 is shown by way of example, and is not to be considered as being limitative of the present invention. For example, it would also be acceptable to arrange for the controller 100 to comprise a channel adapter and a disk adapter which were made as individual independent control modules, and a cache memory and a shared memory and the like.

The cache controller 110 is a device for controlling data input and output to and from the cache memory 140, and so on. This cache controller 110 may, for example, comprise an assurance code appending and deletion circuit 111, an assurance code checking circuit 112, a redundant data generation circuit 113, and a block size conversion circuit 114.

Although the operation of each of these circuits 111 through 114 will be described hereinafter, a simple explanation follows: the assurance code appending and deletion circuit 111 is a circuit for appending an assurance code to the data, or for deleting an assurance code from the data. The assurance code checking circuit 112 is a circuit for checking the contents and so on of the data, using the assurance code which is appended to the data. The redundant data generation circuit 113 is a circuit for creating redundant data such as parity data or the like. And the block size conversion circuit 114 adjusts the size of a data range write object which includes the write data, so as to agree with the physical format of the storage unit 200.

The host I/F 120 is a device for performing transmission and reception to and from the host 20. The disk I/F 130 is a device for performing transmission and reception to and from disk drives 210 within the storage unit 200. In the figure, for the convenience of explanation, only one each of the host I/F 120 and the disk I/F 130 are shown, but it would also be possible to provide a plurality of these I/Fs 120 and 130.

The cache memory 140 is a memory for temporarily storing data which is accessed from the host 20. The program memory 150 is a memory for storing, for example, a control program such as a disk array control program 151 or the like, and control information. It should be understood that, for example, the construction may be such that a control program or control information is stored in one portion of the memory, while the remaining portion thereof is used as a cache region.

The MPU 160 is a device for controlling the operation of the storage system 10. This MPU 160 may, for example, control the operation of the storage system 10 by reading in and executing the abovementioned disk array control program 151.

The bus bridge 170 connects the MPU 160 and the program memory 150 to the cache controller 110. The cache controller 110 is connected to the host I/F 120, the disk I/F 130, and the cache memory 140.

The storage unit 200 comprises at least one or more disk drives 210. As these disk drives 210, there may be cited, for example, hard disk drives, flexible disk drives, optical disk drives, or the like. In this embodiment, disk drives are used which are provided with sectors of a fixed size, such as, for example, ATA disks. However, the present invention is not to be considered as being limited to this case; it could also be applied to the case of a disk drive in which the sector size (the physical block size) could be set in a variable manner.

A logical volume (LU: Logical Unit) 220, which constitutes an object of access from the host 20, is formed by using all or a portion of the physical storage regions upon the disk drives 210. Such a LU 220 is a logical storage region which is established on a physical storage region, and may also be termed a logical storage device.

For example, it is possible to build up a RAID1 LU 220 by pairing master disk drives and sub disk drives. Furthermore, it is also possible to build up an LU 220 which is endowed with redundancy such as with RAID5 or the like from, for example, a plurality of data disk drives and one or a plurality of parity disk drives. In the following explanation, sometimes such parity data will be termed redundant data. It should be understood that it is not necessary for the disk drive on which such redundant data is stored to be fixed; it would also be possible to store the redundant data on various ones of the disk drives which make up the RAID group, by dispersing it in a predetermined order.

(2) The Correspondence Relationships of Block Sizes

Figure 3:
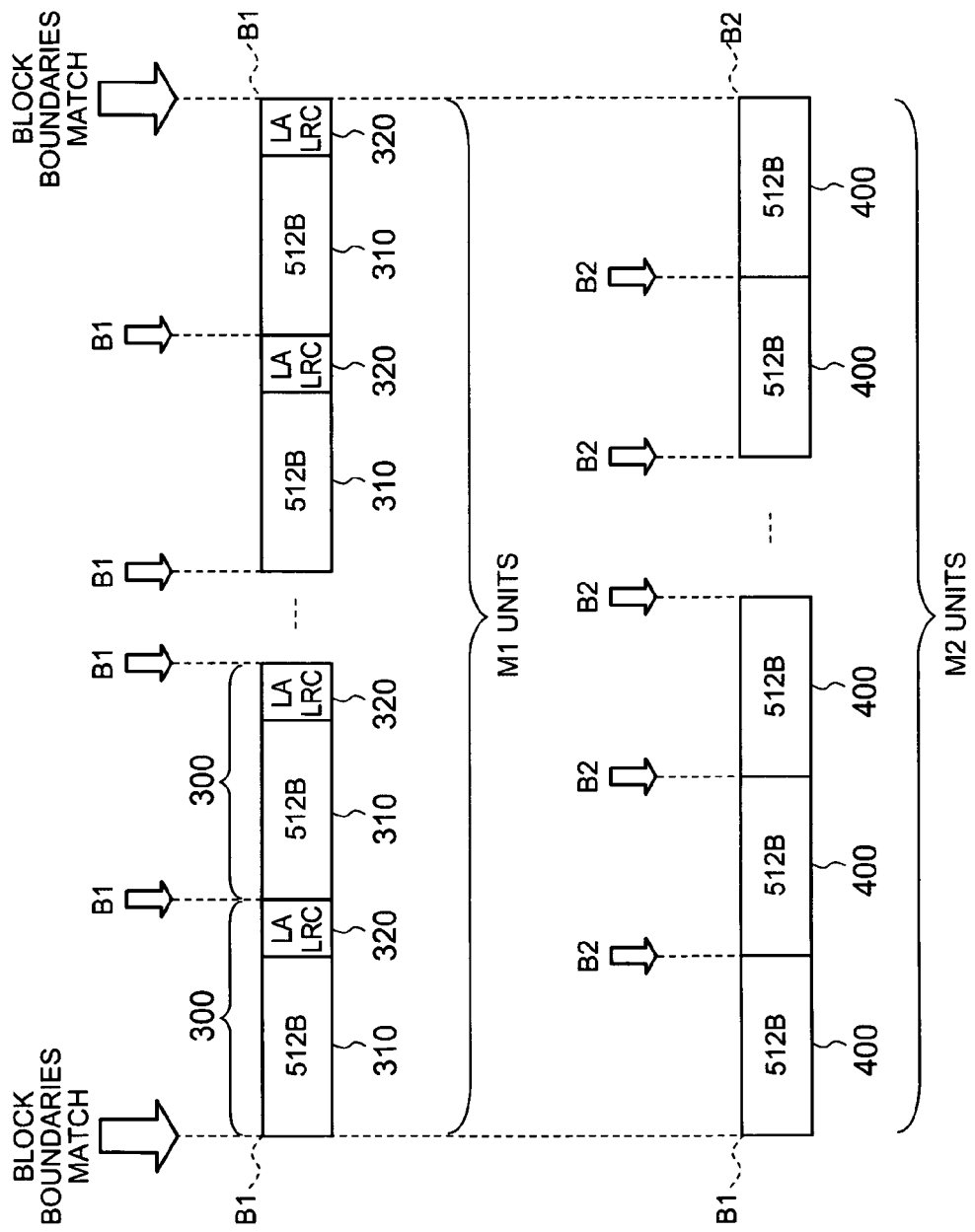
FIG. 3 is an explanatory figure schematically showing the relationship between an extended logical block which is stored in a cache memory and a physical block on a disk drive.

FIG. 3 is an explanatory figure schematically showing the correspondence relationship between the units of data handled by the controller 100 and the units of data handled by the disk drives 210.

In the upper part of FIG. 3, there are shown the units of data when the controller 100 is performing input and output of data to and from the disk drives 210. In this specification, the units in which the controller 100 handles data are defined as the "extended logical blocks 300".

These extended logical blocks 300 have a size of, for example, 520 bytes. An extended logical block 300 consists of a logical block 310 and an assurance code 320. The logical blocks 310 are the units when the host 20 is inputting and outputting data to and from the storage system 10, and they consist of 512 bytes of data.

On the other hand, the assurance codes 320 are information for guaranteeing the stored contents of the logical blocks 310 and the storage destinations of the logical blocks 310, and they consist of 8 bytes of data, including an LA and an LRC. Accordingly, the size of the extended logical blocks 300 is the value of 520 bytes, obtained by adding 8 bytes to 512 bytes. It should be understood that it is not necessary for all of the bytes of the assurance codes 320 to be used; for example, it would be acceptable for a region of about two bytes or so to be left empty.

In the lower part of FIG. 3, there are shown the units of data when the disk drives 210 are performing data input and output. In this specification, these units in which the disk drives 210 handle data are defined as the "physical blocks 400". These physical blocks 400 have a size of 512 bytes.

Furthermore, in this specification, the boundaries between the extended logical blocks 300 are defined as the "extended logical block boundaries B1". In the same manner, the boundaries between the physical blocks 400 are defined as the "physical block boundaries B2".

In the example shown in FIG. 3, when the extended logical blocks 300 are compared with the physical blocks 400, their size is only 8 bytes larger. Accordingly, when 64 of the extended logical blocks 300 are arranged successively, and 65 of the physical blocks 400 are arranged successively, the total value of the difference in size (8 bytes) between these blocks 300 and 400 becomes 512 bytes, which is equal to the size of one of the physical blocks 400. Accordingly, the total size when 64 of the extended logical blocks 300 (i.e. M1 thereof) are lined up successively, and the total size when 65 of the physical blocks 400 (i.e. M2 thereof) are lined up successively, agree with one another.

If the number of the extended logical blocks 300 when the total size of all of the extended logical blocks 300 and the total size of all of the physical blocks 400 agree with one another is termed M1, and the size of the extended logical blocks 300 is termed BS1 while the size of the physical blocks 400 is termed BS2, then M1=BS2/(BS1−BS2).

In this case, the endmost extended logical block boundaries B1 and the endmost physical block boundaries B2 agree with one another. In other words, the total size from its head end to its tail end of the group of 64 successively lined up extended logical blocks 300, and the total size from its head end to its tail end of the group of 65 successively lined up physical blocks 400, are equal to one another. Accordingly, both ends of the group of extended logical blocks 300 and both ends of the group of physical blocks 400 match one another. In other words, in this case, the two extended logical block boundaries B1 which are positioned at both ends of the group of extended logical blocks 300 respectively match the two physical block boundaries B2 which are positioned at both ends of the group of physical blocks 400. This state in which the extended logical block boundaries B1 and the physical block boundaries B2 match one another in this manner, in this specification, will be defined by "the block boundaries agree with one another".

It should be understood that although, in the previous discussion, the size of the extended logical blocks 300 was stated to be 520 bytes, while the size of the physical blocks 400 was stated to be 512 bytes, these values were only cited by way of example; the present invention may be applied in other cases. The present invention can, in fact, be applied in any case in which the size of the extended logical blocks 300 and the size of the physical blocks 400 are different from one another.

Accordingly, it is possible to apply the present invention even if the extended logical blocks 300 are not provided with assurance codes 320, provided that the size of the extended logical blocks 300 is different from the size of the physical blocks 400.

(3) Read Processing

The method for processing of a read request which has been issued from the host 20 will now be explained with reference to the flow chart of FIG. 4. It should be understood that, in the flow charts discussed hereinafter, a summary is given of the relevant processing within the range which is necessary for understanding and implementation of the present invention, and in some cases there may be differences from the actual computer program which is used. Furthermore, for the convenience of explanation, "step" is sometimes abbreviated as "S".

Figure 4:
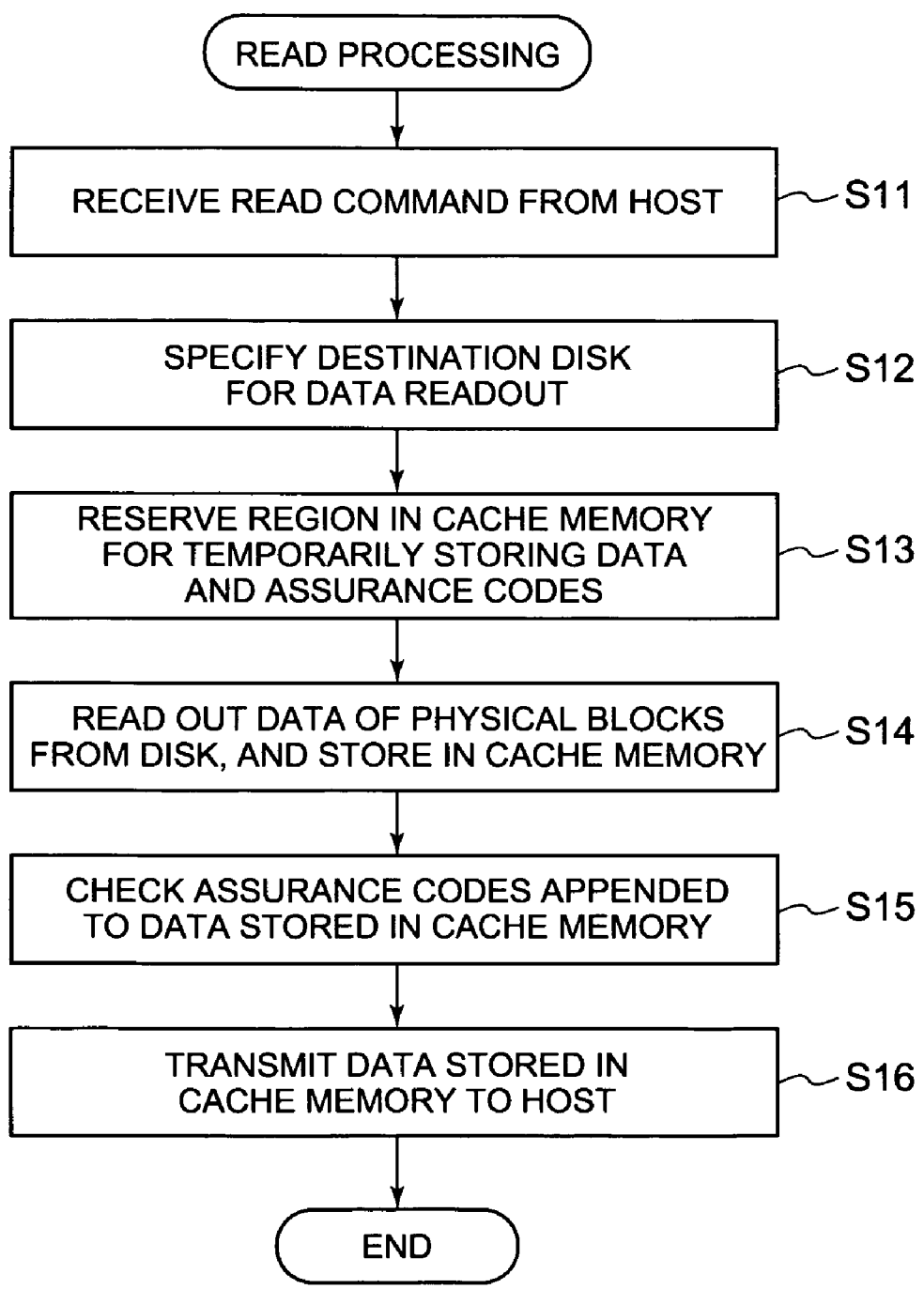
FIG. 4 is a flow chart showing the flow of reading processing.

The read processing shown in FIG. 4 is implemented by the MPU 160 of the controller 150 executing the disk array control program 151. However, for the convenience of explanation, principally, the operation of the controller 100 will mainly be described.

The host 20 issues a read request (a read command) by specifying the number (the volume number) of the LU 220 in which the data which is the object of reading is stored, and moreover by indicating the leading address (the leading LA) and the number of logical blocks of the destination for reading out. The number of logical blocks on from the leading LA gives the size of the data to be read out.

Upon receipt of this read request from the host 20, the controller 100 checks the leading LA and the number of logical blocks (in a step S11). Furthermore, the controller 100 specifies (in the step S11), based on this leading LA and number of logical blocks, the logical blocks which must be read out from the disk drives 210, and the assurance codes which are appended to these logical blocks.

And the controller 100 specifies the physical blocks 400 in which are stored the logical blocks and the assurance codes (in other words, the data of the extended logical blocks 300) which have been specified, and determines (in a step S12) from which of the disk drives 210 this data is to be read out.

Since the controller 100 is aware of the correspondence relationship between the extended logical blocks 300 and the physical blocks 400, it is able to determine the physical blocks 400 for which the data must be read out, based on the correspondence relationships between these blocks.

For example, if the read object is a single extended logical block 300, and this single extended logical block 300 is stored as straddling over two consecutive physical blocks 400, then the controller 100 takes these two consecutive physical blocks 400 as being the physical blocks 400 which are the source for data readout. And the controller 100 specifies the disk drives which contain the physical blocks 400 which are the data source for data readout, as being the disk drives of the source for data readout.

It should be understood that, as well as the physical blocks 400 in which the data which is the read object is stored, the controller 100 may also read out other physical blocks 400 together with them. In other words, with a single read command, it may also read out other physical blocks 400 than the physical blocks 400 of the read object, in addition to and together with these physical blocks 400 of the read object, in which the data of the read object is stored. By doing this, it is possible to reduce the number of times data is read out from the disk drives 210 by the controller 100. In this case, among the data which has been read out from the disk drives 210 in a superfluous manner, only the required data may be used.

For example, the case may be considered in which the data of the read object is stored as being dispersed in a discontinuous manner over several logical blocks. In this case, it may be arranged to read out, at one time with one read command, a continuous plurality of physical blocks 400, so as to include these disconnected logical blocks. By doing this, it is possible to reduce the frequency of access to the disk drives 210 by the controller 100, and thereby to improve the response performance of this storage system 10.

Next (in a step S13) the controller 100 reserves a storage region in the cache memory 140 for temporarily storing the data of the logical blocks 310, and their assurance codes 320, which have been read out from the disk drives 210.

The controller 100 specifies the physical blocks 400 which are the source for data readout, and issues a command to the disk I/F 130. The disk I/F 130 issues commands to the disk drives 210 which have been designated from the controller 100 in order to read out the data of the physical blocks 400 which have been designated. And the disk I/F 130 stores (in a step S14) the data which has been read out from the disk drives 210 in the region in the cache memory 140 which was reserved in the step S13.

The assurance code checking circuit 112 of the controller 100 checks (in a step S15) the assurance codes 320 which have been stored in the cache memory 140. By doing this, it is possible to check that there is no error in the contents of the logical blocks 310 which have been read out from the disk drives 210. If an error has been discovered by this checking of the assurance codes 320, then error processing is performed. In this error processing, for example, the data may be read out again, the data may be automatically repaired, the occurrence of an error may be notified to the host 20, or the like.

When it has been checked that there is no error in the data which has been read out from the disk drives 210, then the controller 100 transmits (in a step S15) only the data of the logical blocks 310 to the host 20 via the host I/F 120. In other words, the assurance codes 320 are not transmitted from the controller 100 to the host 20. The assurance codes 320 are information which is used in the interior of the storage system 10.

(4) Write Processing

Figure 5:
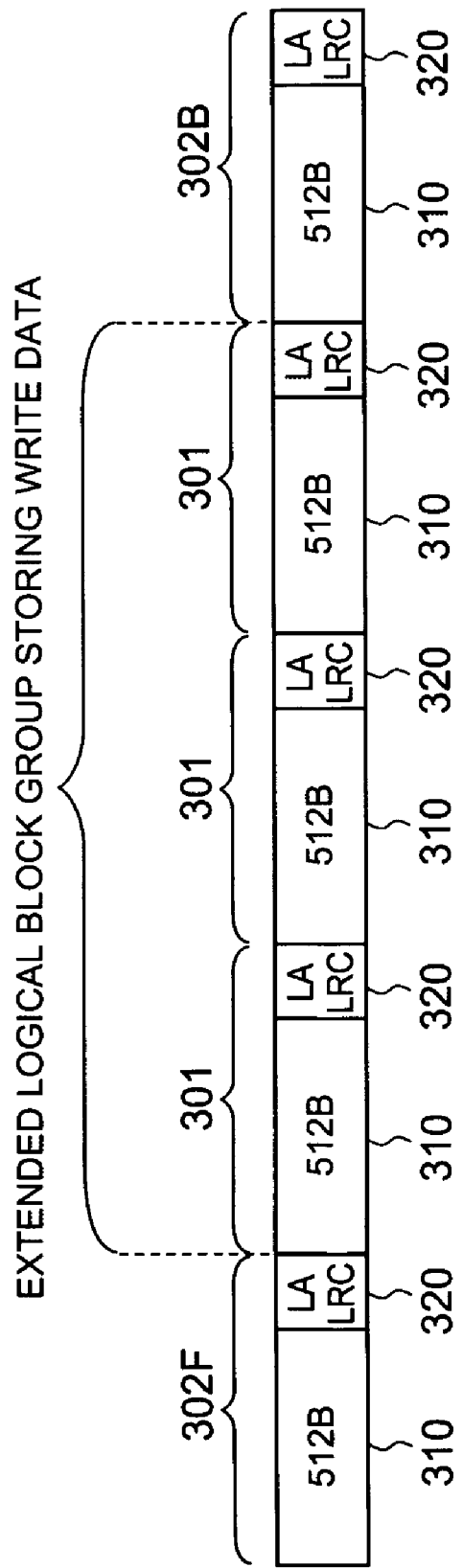
FIG. 5 is an explanatory figure showing a situation in which a write data block and a block which is adjacent to that write data block are linked together, so as to obtain data for a write object range.

Next, the method of processing a write request which has been issued from the host 20 will be explained. First, FIG. 5 shows the situation in which the write data is stored in the cache memory 140. In this specification, the extended logical block 300 which incorporates a logical block 310 in which write data is stored and its assurance code 320 is defined as a "write data block 301". Furthermore, in this specification, the extended logical blocks 300 which are adjacent before and after this write data block 301 will be defined as "adjacent blocks 302". Among these two adjacent blocks 302, the one which is adjacent to the head end side of the write data block 301 will be termed the head end side adjacent block 302F, while the one which is adjacent to the tail end side of the write data block 301 will be termed the tail end side adjacent block 302B.

According to the size of the write data, a plurality of write data and their assurance codes are contiguously stored in a plurality of contiguous write data blocks 301. Adjacent blocks 302 are present before and after these contiguous write data blocks 301. The one 302F of these adjacent blocks is that extended logical block 300 one before the write data block 301 which is positioned at the headmost end of the contiguous write data blocks 301. And the other one 302B of these adjacent blocks is that extended logical block 300 one after the write data block 301 which is positioned at the tailmost end of the contiguous write data blocks 301. The former adjacent block 302F is defined as being the head end side adjacent block, while the latter adjacent block 302B is defined as being the tail end side adjacent block.

In this manner, before performing writing to the disk drive 210, in the cache memory 140, at least one or more of the write data blocks 301 and an adjacent block 302 are read out and are stored. And, as will be described hereinafter, superfluous data is deleted from the adjacent block 302, and, after having adjusted the size of the data which is to become the write object range, writing thereof to the disk drive 210 is performed.

Figure 6:
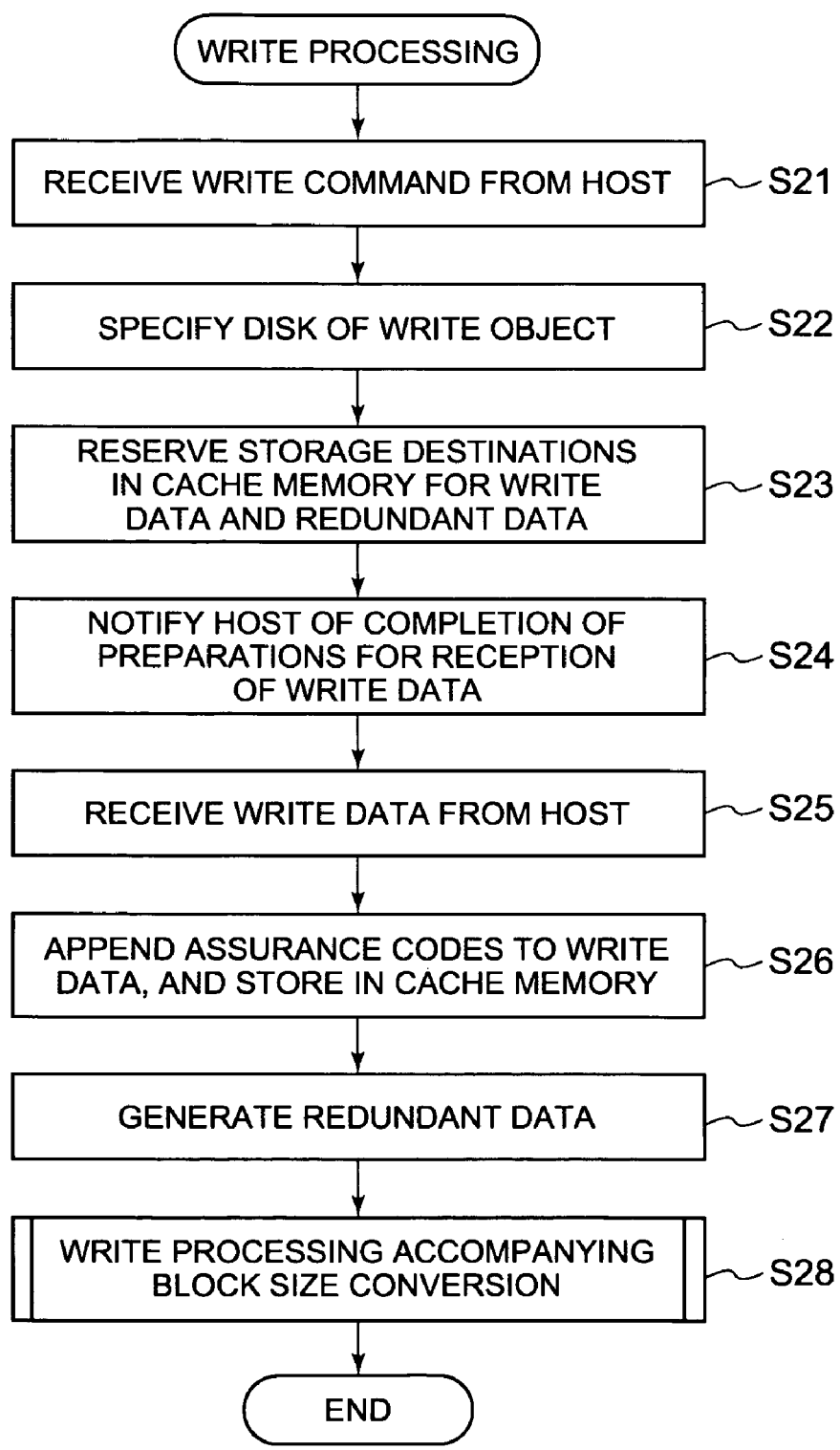
FIG. 6 is a flow chart showing the overall flow of write processing.

FIG. 6 is a flow chart showing the flow of the write processing. The host 20 issues a write command which designates a write destination address or the like. And, when the host 20 issues this write command to the storage system 10, the controller 100 receives this write command via the host I/F 120 (in a step S21).

Thus, the host 20 takes a logical block 310 of length 512 bytes as being one unit, and issues a write command which specifies the writing of m logical blocks worth of data (where m is an integer greater than or equal to 1). In this write command, there are included the leading LA of the data which is written by the write command, and the size of this write data (the number of logical blocks, which specifies how many logical blocks of data there are).

And, based on the leading LA of the write destination included in the write command the controller 100 specifies (in a step S22) the disk drive 210 on which the write data is to be written. Furthermore, the controller 100 reserves (in a step S23), in the cache memory 140, a storage region for temporarily storing the write data, and a storage region for temporarily storing redundant data which is generated for this write data. It should be understood that, at this time, the controller 100 also reserves (in the step S23), in the cache memory 140, a storage region for storing the assurance code 320 which is appended to the write data by the assurance code appending and deletion circuit 111.

Via the host I/F 120, the controller 100 notifies (in a step S24) the host 20 to the effect that preparations for receiving the data have been completed. The host 20 then transmits write data to the amount of the number of logical blocks which have been specified in the write command to the host I/F 120.

The controller 100 receives (in a step S25) this write data from the host 20 via the host I/F 120. It should be understood that the controller 100 may, at the time point that it has completed reception of the write data, notify the host 20 to the effect that the processing of the write request has been completed.

The write data which has been received is transferred to the cache controller 110. The assurance code appending and deletion circuit 111 within the cache controller 110 generates an assurance code 320 for each of the logical blocks 310 (in other words, a leading LA and an LRC for that logical block), and sets these assurance codes 320 to their corresponding ones of the logical blocks 310 and stores them in the cache memory 140 (in a step S26). It should be understood that, if the write data which has been received from the host 20 is one logical block in size, one assurance code 320 is generated for this one logical block 310.

When the write data is stored in the cache memory 140 in the format of an extended logical block 300, in other words, when the write data blocks 301 shown in FIG. 5 are stored in the cache memory 140, the controller 100 generates redundant data (in a step S27).

In greater detail, when the host I/F 120 notifies the MPU 160 of the completion of reception of the write data, the MPU 160 controls the redundant data generation circuit 113 by using the disk array control program 151. By doing this, the redundant data generation circuit 113 generates redundant data corresponding to the write data which has been stored in the cache memory 140. This redundant data which has thus been generated is stored (in a step S27) in the storage region within the cache memory 140 which was reserved for it in the step S23. It should be understood that the details of the processing when using parity data, such as for example according to RAID5 or the like, will be explained hereinafter with reference to another embodiment.

According to a command from the MPU 160, the disk I/F 130 of the controller 100 writes (in a step S28) the write data and the assurance code 320, or the redundant data, which are stored in the cache memory 140 to the disk drive 210 which was specified in the step S22.

At this time, the write data in the cache memory 140 consists of the extended logical blocks 300 of 520 bytes to which the assurance codes 320 are appended. By contrast, the disk drive 210 which is the write destination for the data in the cache memory 140 is structured in physical blocks 400 of 512 bytes.

In this manner, the write data which is written into the disk drive 210 consists of extended logical blocks 300 of 520 bytes, while the disk drive 210 which is the write destination stores data in units of 512 bytes. Accordingly, it is necessary to match the size of the write data which is structured as the extended logical blocks 300 to the size of the physical blocks 400. In this specification, the processing for writing the data to the disk drive 210 after having performed this conversion of block size is termed "write processing accompanying block size conversion" (a step S28).

It should be understood that, as will be described hereinafter, before writing the data of the write data blocks 301 into the disk drive 210, a check is performed by the assurance code checking circuit 112 as to whether or not the contents of the write data (the LRC) which is to be written and its write destination (the LA) are correct or not.

Figure 7:
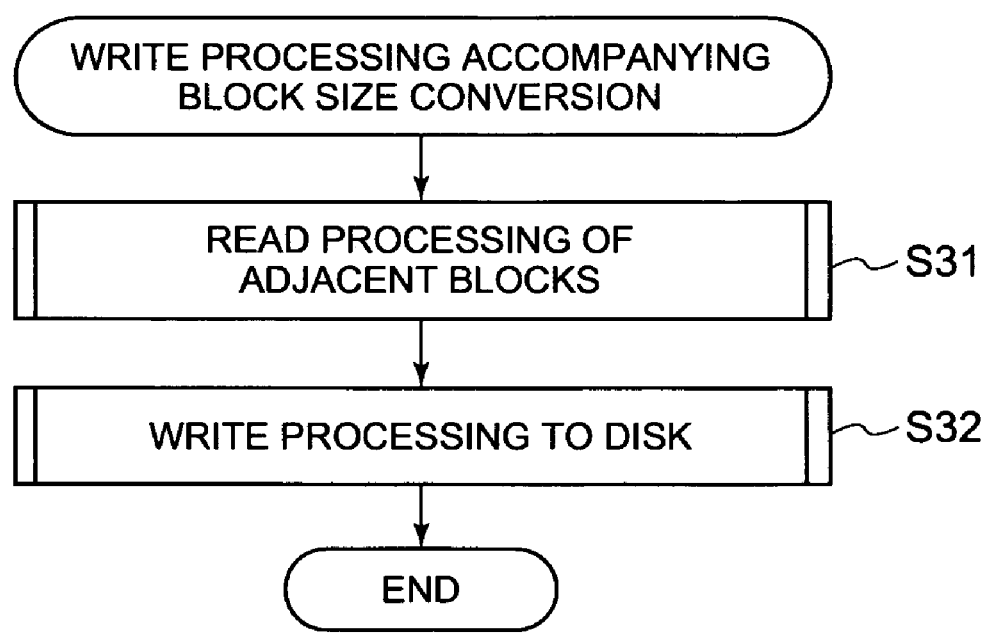
FIG. 7 is a flow chart showing the details of a step S28 in the FIG. 6 flow chart.

FIG. 7 is a flow chart showing the "write processing accompanying block size conversion" shown as the step S28 in FIG. 6. As shown in FIG. 7, this write processing accompanying block size conversion (of the step S28) may be generally classified into read processing for the adjacent blocks (a step S31), and write processing to the disk (a step S32).

The details of these steps S31 and S32 will be described hereinafter. First to explain them in simple terms: in the read processing for the adjacent blocks (the step S31), the controller 100 reads out from the disk drive 210 which was specified as the write destination the data of the blocks 302 which are adjacent to the write data block 301, and stores this data in the cache memory 140. As explained with reference to FIG. 5, the write data block 301 and the adjacent data blocks 302 are each stored in the cache memory 140. However, it is not the case that both of the plurality of adjacent blocks 302F and 302B are always read out; sometimes only one or the other of these adjacent blocks 302F and 302B is read out, and also sometimes neither one of these adjacent blocks 302F and 302B is read out.

In the write processing to the disk (of the step S32), the controller 100 writes the write data block 301 and the adjacent blocks 302 to the disk drive 210 which has been specified as the write destination. When performing this writing, the MPU 160 controls the assurance code checking circuit 112 so as to make checks on the assurance codes 320 of the write data block 301 and the adjacent blocks 302.

Furthermore, by controlling the block size conversion circuit 114, the MPU 160 adjusts the size of the adjacent blocks 302, so that the result of merging the write data blocks 301 and the adjacent blocks 302 (the write object range) becomes an integral multiple of the block size of the physical blocks 400. No change is made to the size of the write data blocks 301.

Figure 8:
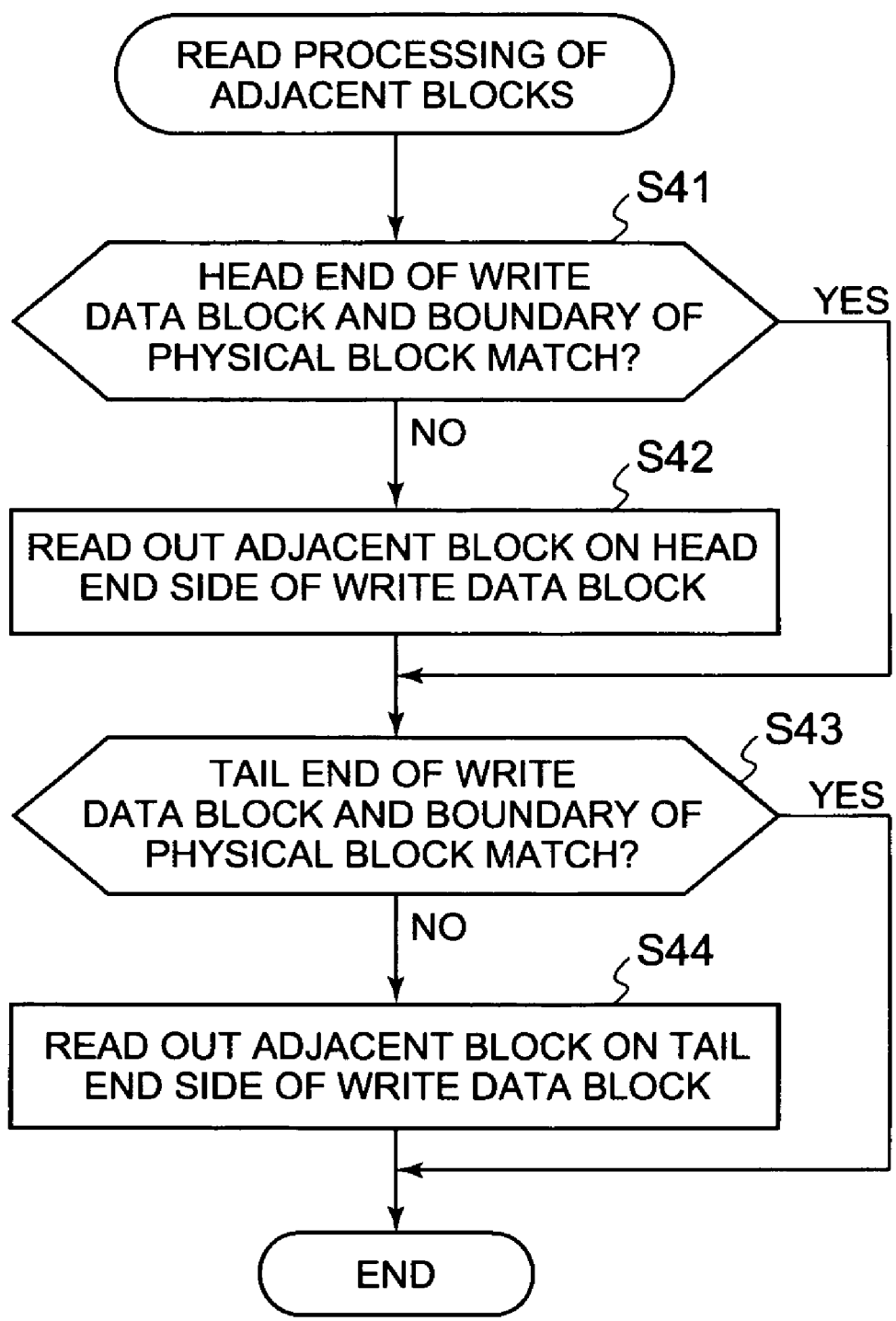
FIG. 8 is a flow chart showing the details of a step S31 in the FIG. 7 flow chart.

FIG. 8 is a flow chart showing the details of the read processing of the adjacent block, shown as the step S31 in FIG. 7. First, the controller 100 decides whether or not (in a step S41) the extended logical block boundary B1 of the head end side of the write data block 301 which is stored in the cache memory 140 and a physical block boundary B2 agree with one another. If a plurality of write data blocks 301 are contiguously arranged, it decides whether or not the boundary B1 at the head end side of the headmost write data block 301 and a physical block boundary B2 agree with one another.

This decision as to whether or not the extended logical block boundary B1 and a physical block boundary B2 agree with one another, may be performed based on the write command which has been received from the host 20. As described above, in the write command there is included, in addition to the head address of the write data, the number of logical blocks, which specifies the total size of the write data.

Since the size of the logical blocks 310 is 512 bytes, if the number of logical blocks is a multiple of 64, the extended logical block boundaries B1 at both ends of the write-data blocks 301 which are stored in the cache memory 140 will each match a physical block boundary B2, so that it is possible to decide that the condition of the "block boundaries matching" holds.

Thus, the controller 100 makes a decision (in a step S41) as to whether or not the extended logical block boundary B1 at the head end side of the write data blocks 301 matches a physical block boundary B2, and, if the condition of the block boundaries matching does not hold (S41: NO), then it reads out the head end side adjacent block 302F from the disk drive 210, and stores it in the cache memory 140 (in a step S42). In this acquisition of the head end side adjacent block 302F, the read processing which was described with reference to FIG. 4 is used. It should be understood that, if the extended logical block boundary B1 at the head end side of the write data blocks 301 does match a physical block boundary B2 (S41: YES), then the step S42 is skipped and control passes to the step S43. In other words, if both of these boundaries B1, B2 agree with one another (S41: YES), then the head end side adjacent block 302F is not read out.

Next, the controller 100 makes a decision (in a step S43) as to whether or not the extended logical block boundary B1 at the tail end side of the write data block 301 matches a physical block boundary B2. In the same manner as above, if a plurality of write data blocks 301 are consecutively contiguous, a decision is made as to whether or not the boundary B1 at the tail end side of the write data block 301 at the final end matches a physical block boundary B2.

If these two boundaries B1 and B2 do not match one another (S43: NO), then the controller 100 reads out the tail end side adjacent block 302B of the write data block 301 from the disk drive 210 which uses the read processing, and stores it in the cache memory 140 (in a step S44). On the other hand, if the boundary B1 at the tail end side of the write data block 301 does match a physical block boundary B2 (S43: YES), then the step S44 is skipped. Thus, if the boundary B1 at the tail end side and a physical block boundary B2 match one another (S43: YES), then the tail end side adjacent block 302B is not read out.

It should be understood that the adjacent blocks 302 which have thus been read out from the disk drive 210 are only stored in the cache memory 140; it is not necessary for the data of these adjacent blocks 302 to be transmitted to the host 20.

Figure 9:
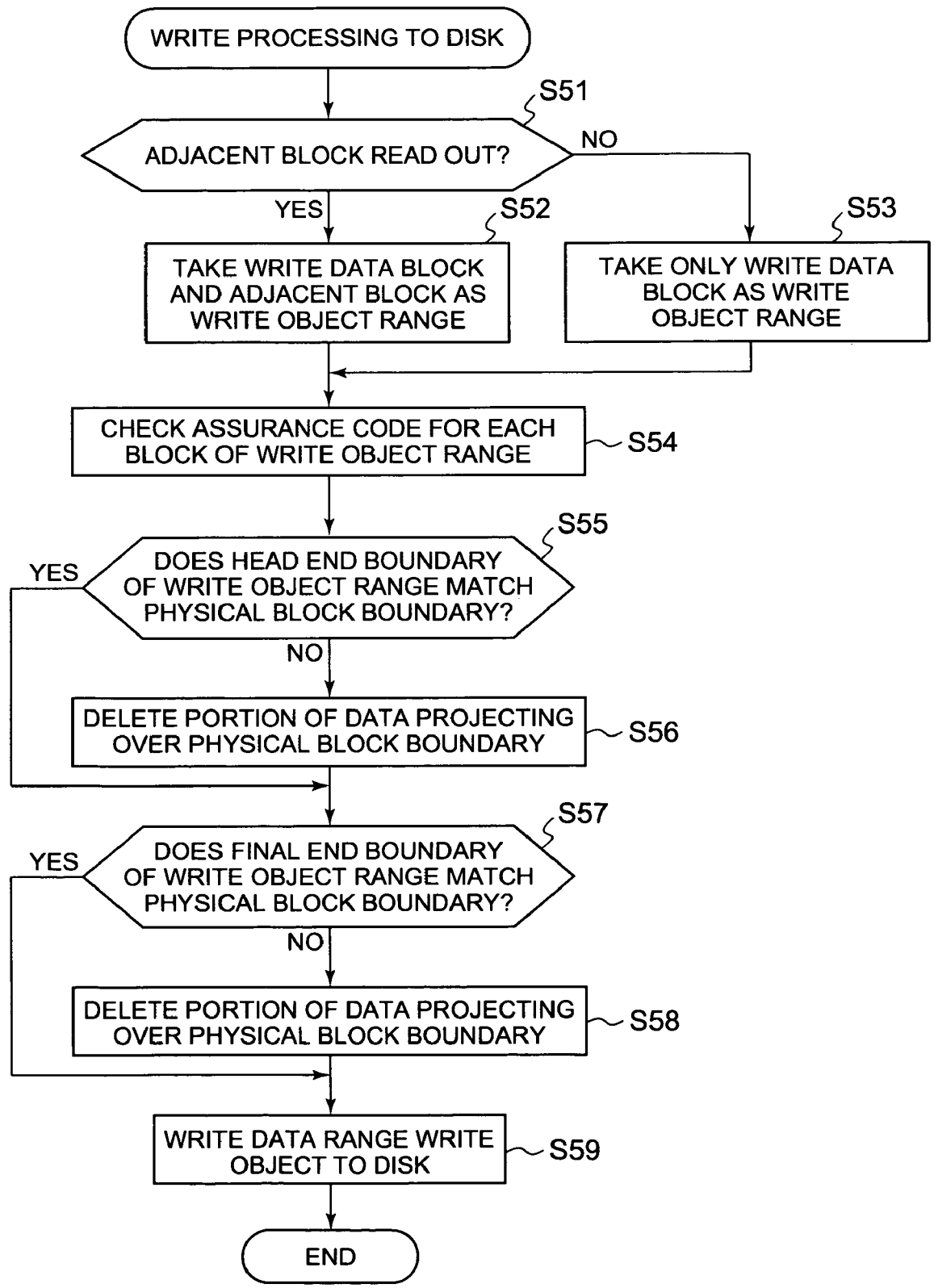
FIG. 9 is a flow chart showing the details of a step S32 in the FIG. 7 flow chart.

FIG. 9 is a flow chart showing the details of the "write processing to the disk" shown as the step S32 in FIG. 7.

The controller 100 makes a decision (in a step S51) as to whether or not the adjacent block 302 adjacent to the write data block 301 has been read out. This decision (in the step S51) as to whether or not the adjacent block 302 has been read out from the disk drive 210 and has been stored in the cache memory 140 is performed separately for each of the head end side adjacent block 302F and the tail end side adjacent block 302B.

If the adjacent block 302 is stored in the cache memory 140 (S51: YES), then (in a step S52) the controller 100 takes the adjacent block 302 and the write data block 301 as data of the "write object range". By the write object range is meant data to be written into the disk drive 210. If the adjacent block 302 has been read out (S51: YES), then not only is the write data block 301 included in the write object range, but also data other than the write data block 301 (i.e. the data of the adjacent block 302) is included therein.

On the other hand, if the adjacent block 302 is not stored in the cache memory 140 (S51: NO), then the controller 100 takes only the write data block 301 as being the "write object range" (in a step S53).

Accordingly, if both the head end side adjacent block 302F and the tail end side adjacent block 302B are stored in the cache memory 140, then the data range to be written to the disk drive 210 consists of the write data block 301, the head end side adjacent block 302F, and the tail end side adjacent block 302B. But, if neither the head end side adjacent block 302F nor the tail end side adjacent block 302B is stored in the cache memory 140, then the data range to be written to the disk drive 210 consists of the write data block 301 only. On the other hand, if only one of the head end side adjacent block 302F and the tail end side adjacent block 302B is stored in the cache memory 140, but not the other, then the data range to be written to the disk drive 210 consists of the write data block 301, and that one of the head end side adjacent block 302F and the tail end side adjacent block 302B.

After having determined the write object range in this manner, the controller 100 checks the assurance codes of the write object range which has been thus determined, using the assurance code checking circuit 112. The controller 100 checks the assurance codes of each of the write data blocks 301 and of each of the adjacent blocks 302 which have been selected as being the write object range.

If the result of this checking is that an error has been detected, then, as described above, it is possible to perform error processing for error recovery. With regard to the method of checking using the assurance codes, and the error processing upon error detection, these matters do not relate to the gist of the present invention, and accordingly explanation thereof will be omitted, since they may be performed by per se known techniques.

If the check result for the assurance codes is that they are normal, then, as described in steps S55 through S59, the controller 100 deletes superfluous data from the adjacent blocks 302 using the block size conversion circuit 114. By doing this, the controller 100 converts the size of the data range write object to an integral multiple (one or more) of the size of the physical blocks 400.

First, the controller 100 decides (in the step S55) whether or not the boundary B1 at the head end of the write object range and a physical block boundary B2 agree with one another. If the boundary B1 at the head end and a physical block boundary B2 do not agree with one another (S55: NO), then the controller 100 deletes (in the step S56), from the head end side adjacent block 302F, the portion of the data which projects from the physical block boundary B2.

In the same manner, the controller 100 makes a decision (in the step S57) as to whether or not the boundary B1 at the final end of the write object range and a physical block boundary B2 agree with one another. And, if the boundary B1 at the final tail end and a physical block boundary B2 do not agree with one another (S57: NO), then the controller 100 deletes (in the step S58), from the tail end side adjacent block 302B, the portion of the data which projects from the physical block boundary B2.

After having made both ends of the write object range match with physical block boundaries B2 in this manner, the controller 100 writes this data range write object via the disk I/F 130 to the disk drive 210 (in the step S59).

Figure 10:
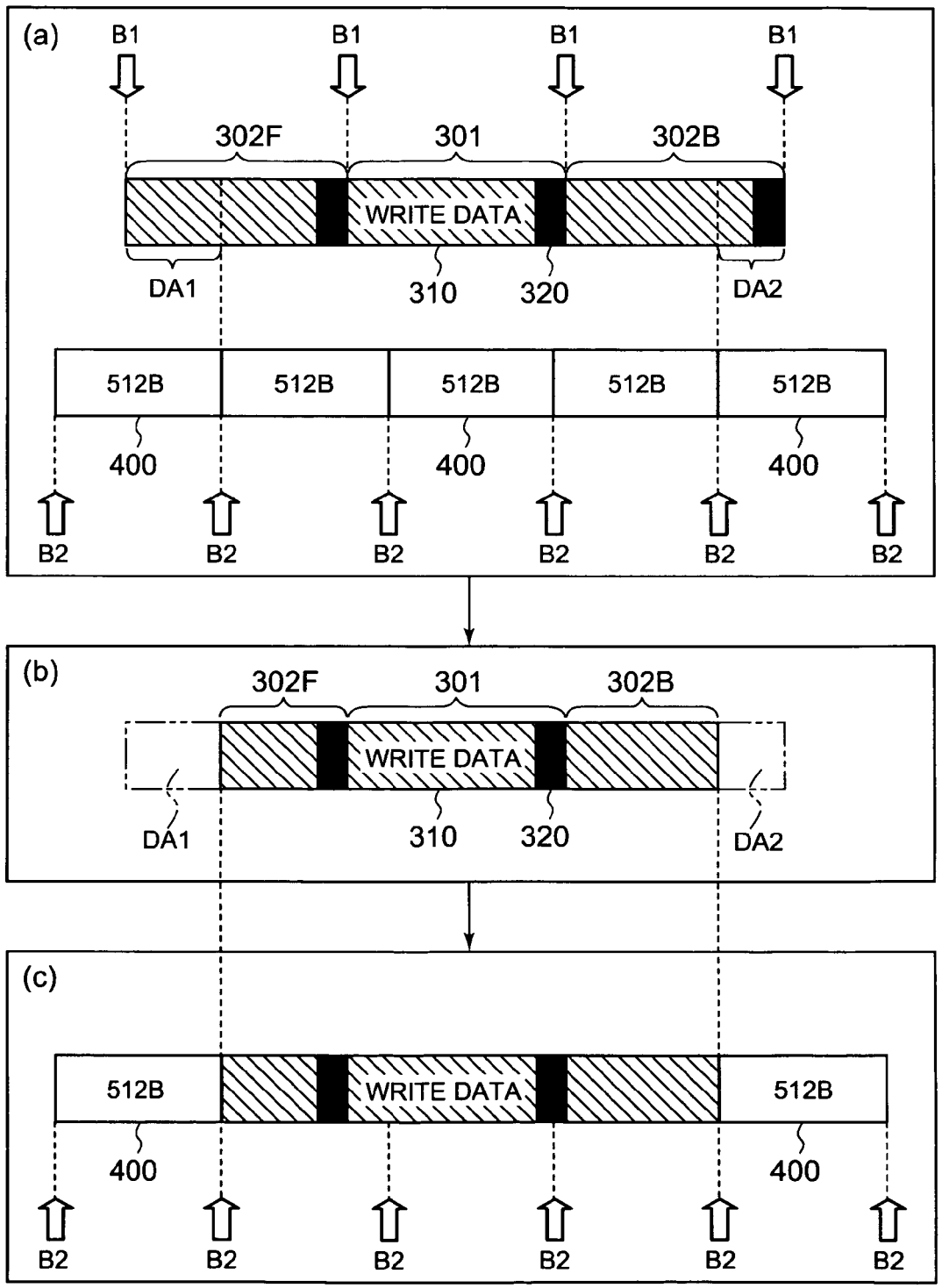
FIG. 10 is an explanatory figure showing a situation in which adjustment to the size of a physical block is performed by deleting superfluous data from both of the end portions of the write object range.

FIG. 10 is an explanatory figure schematically showing the processing of FIG. 9. FIG. 10(a) shows the case in which the adjacent blocks 302F and 302B before and after the write data block 301 have both been read out into the cache memory 140.

The controller 100 also deletes from the head end side adjacent block 302F the portion of data DA1 which projects over the physical block boundary B2. By doing this, the head end side of the write object range, in other words the head end of the head end side adjacent block 302F, and the physical block boundary B2, are made to coincide.

The controller 100 also deletes from the tail end side adjacent block 302B the portion of data DA2 which projects over the physical block boundary B2. By doing this, the tail end side of the write object range, in other words the final end of the tail end side adjacent block 302B, and the physical block boundary B2, are made to coincide.

The data items DA1 and DA2 which have been deleted may also be termed "deleted data items". It should be understood that, before deleting these deleted data items DA1 and DA2, the controller 100 checks the assurance codes 320 in the step S54. Accordingly, even if an assurance code 320 is included in the range which is deleted, no inconvenience arises, since its checking has already been completed.

As shown in FIG. 10(b), by deleting (cutting off) the superfluous data DA1 and DA2 from the corresponding adjacent blocks 302F and 302B, both ends of the write object range are made to coincide with physical block boundaries B2. In this case, the size of the data range write object becomes an integral multiple of the size of the physical blocks 400.

As shown in FIG. 10(c), the controller 100 writes the data range write object to the disk drive 210, after having adjusted its size. As described above, the data range write object consists of the write data blocks 301 and the adjacent blocks 302F and 302B with the delete data items DA1 and DA2 respectively deleted therefrom, and its size becomes an integral multiple of the size of the physical blocks 400. Accordingly, the controller 100 is able to write this data range write object to the disk drive 210.

Furthermore, the controller 100 of this embodiment reads out one at a time the blocks 302F and 302B which are adjacent to the two ends of the write data blocks 301, in order to adjust the size of the write object range. Accordingly it is possible to make the size of the write object range smaller, as compared, for example, with the case in which a data size which is the least common multiple of the size of the extended logical blocks 300 and the size of the physical blocks 400 is made to be the write object range. As a result, it becomes possible to perform write processing with greater efficiency, as compared with the case of using the least common multiple of the sizes of the blocks 300 and 400 as the unit for the write object range.

Figure 11:
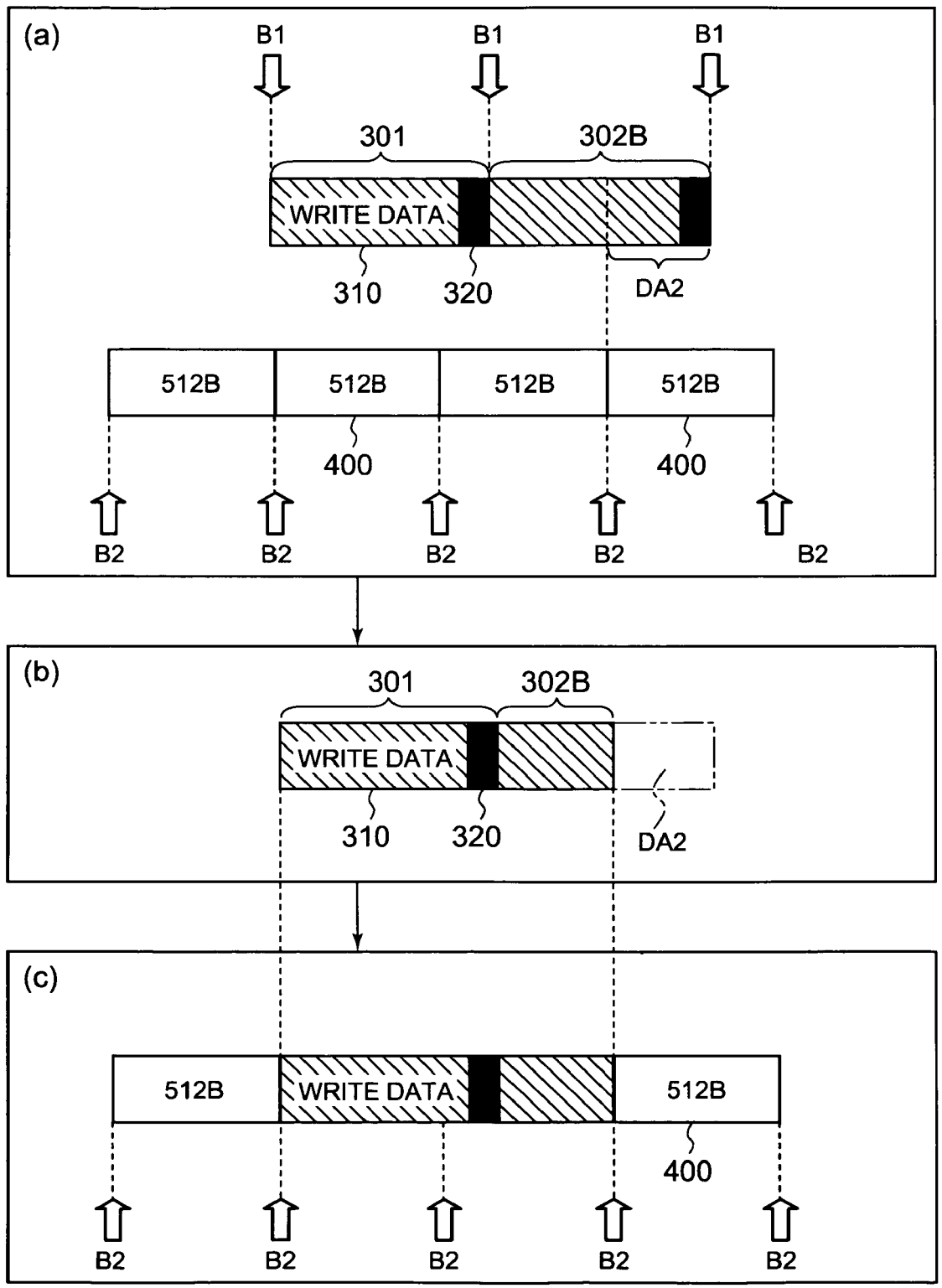
FIG. 11 is an explanatory figure showing a situation in which adjustment to the size of a physical block is performed by deleting superfluous data from one or the other end portion of the write object range.

FIG. 11 shows a case in which only the tail end side adjacent block 302B is read out and is stored in the cache memory 140. As shown in FIG. 11(a), only the final end side of the tail end side adjacent block 302B projects to the outside from the physical block boundary B2, by the amount DA2. In this case, the head end of the write object range is the head end of the write data blocks 301, and coincides with a physical block boundary B2. Accordingly, the head end side adjacent block 302F is not read out from the disk drive 210.

As shown in FIG. 11(b), by deleting this portion DA2 of the data which is projecting, the controller 100 performs adjustment so that the size of the write object range comes to be an integral multiple of the size of the physical blocks 400. And, as shown in FIG. 11(c), the controller 100 writes the data range write object whose size it has thus adjusted to the disk drive 210.

Conversely to the example shown in FIG. 11, if the tail end of the write data blocks 301 coincides with a physical block boundary B2, then only the head end side adjacent block 302F is read out and is stored in the cache memory 140. Thus, in this case, the tail end side adjacent block 302B is not read out. In this case, the controller 100 deletes an amount DA1 of data which projects over the physical block boundary B2 from the head end side adjacent block 302F, then writing the remainder of the data to the disk drive 210. Since this example of processing when only the head side adjacent block 302F is read out can easily be understood from the processing example shown in FIG. 11 and the above explanation thereof, it is not particularly shown in any figure.

Figure 12:
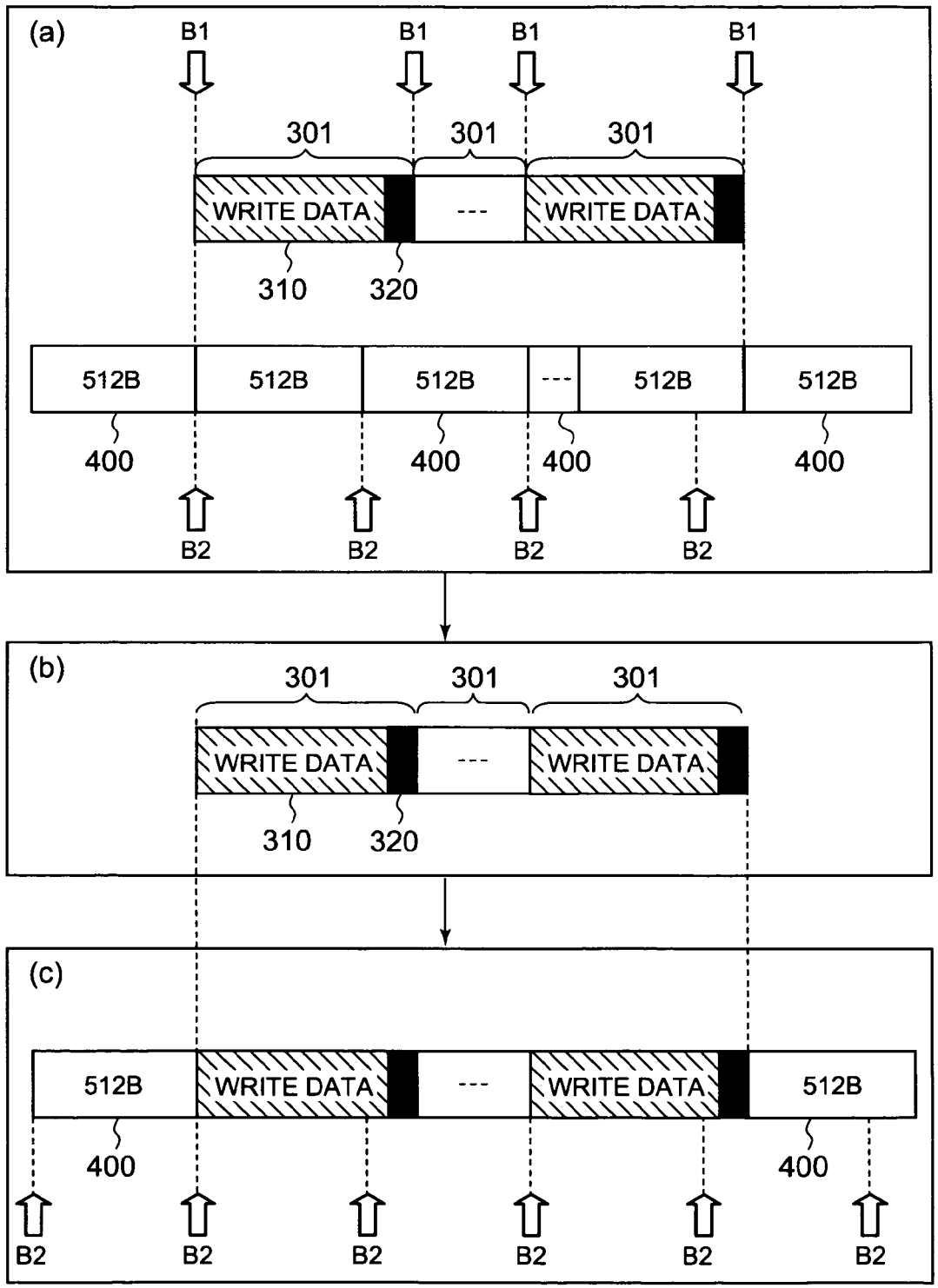
FIG. 12 is an explanatory figure showing the method of writing, when both ends of the write object range agree with the boundaries between physical blocks.

FIG. 12 shows a case in which the headmost end and the final end of the write data blocks 301 both coincide with physical block boundaries B2. In the example shown in FIG. 12, the case is shown in which the total size of the contiguous plurality of write data blocks 301 is equal to the least common multiple of the size of the extended logical blocks 300 and the size of the physical blocks 400.

As shown in FIG. 12(a), in this case, neither the head end side adjacent block 302F nor the tail end side adjacent block 302B is read out from the disk drive 210. Accordingly, as shown in FIG. 12(b), in this case, since no superfluous data DA1 or DA2 is present, deletion of such superfluous data DA1, DA2 is not performed. Thus, as shown in FIG. 12(c), the controller 100 writes the write data blocks 301 to the disk drive 210 just as they are without modification.

It should be understood, as will become clear from the embodiments described hereinafter, that the controller 100 also writes into the disk drive 210, with regard to redundant data related to the write data which it has received from the host 20, by the same method as for the write data. In other words, the controller 100 writes onto the disk drive 210 after having adjusted the block size of the redundant data, without particularly distinguishing between the write data and the redundant data. The concrete method of processing in this case will be explained hereinafter with reference to an embodiment.

With this embodiment, as described above, even if the size of the extended logical blocks 300, which are the units for data input and output within the storage system 10 (within the controller 100), and the size of the physical blocks 400, which are the data input and output units within the disk drives 210, are different from one another, nevertheless it is possible to write on the disk drives 210 by adjusting the size of the data range write object to an integral multiple of the size of the physical blocks 400.

With this embodiment, the data range write object is generated by reading out the blocks 302F and 302B which are adjacent to the write data block or blocks 301 and merging them with the write data block or blocks 301. Accordingly, it is possible to check the data contents and the like which are included in the extended logical blocks 300 by using the assurance codes 320, and it is possible to write them onto the disk drive 210 after having completed this checking. Due to this, it is possible to enhance the reliability in the case of performing input and output of data between blocks whose sizes are different from one another.

With this embodiment, even if the two ends of the write data block 301 do not each match physical block boundaries B2, nevertheless the size of the write object range is adjusted by reading out just one block 302F, 302B adjacent to each of the ends of the write data block 301. Accordingly it is possible to reduce the size of the write object range, as compared with the case in which a data size which is the least common multiple of the size of the extended logical blocks 300 and the size of the physical blocks 400 is taken as the write object range, and it is possible to perform the write processing with better efficiency.

Embodiment 2

A second embodiment of the present invention will now be explained with reference to FIGS. 13 through 17. This second embodiment may be considered as a variant of the first embodiment described above. In this second embodiment, a method is explained of writing the redundant data into the disk drive 210 between blocks whose size is different from one another. In this embodiment, as one example of a RAID structure which utilizes redundant data, a LU 220 which is structured according to RAID5 is cited by way of example. This is not limiting; for example, this embodiment could also be applied to a RAID structure of another type, such as one according to RAID3 or RAID6 or the like.

(1) Write Processing with RAID5

Figure 13:
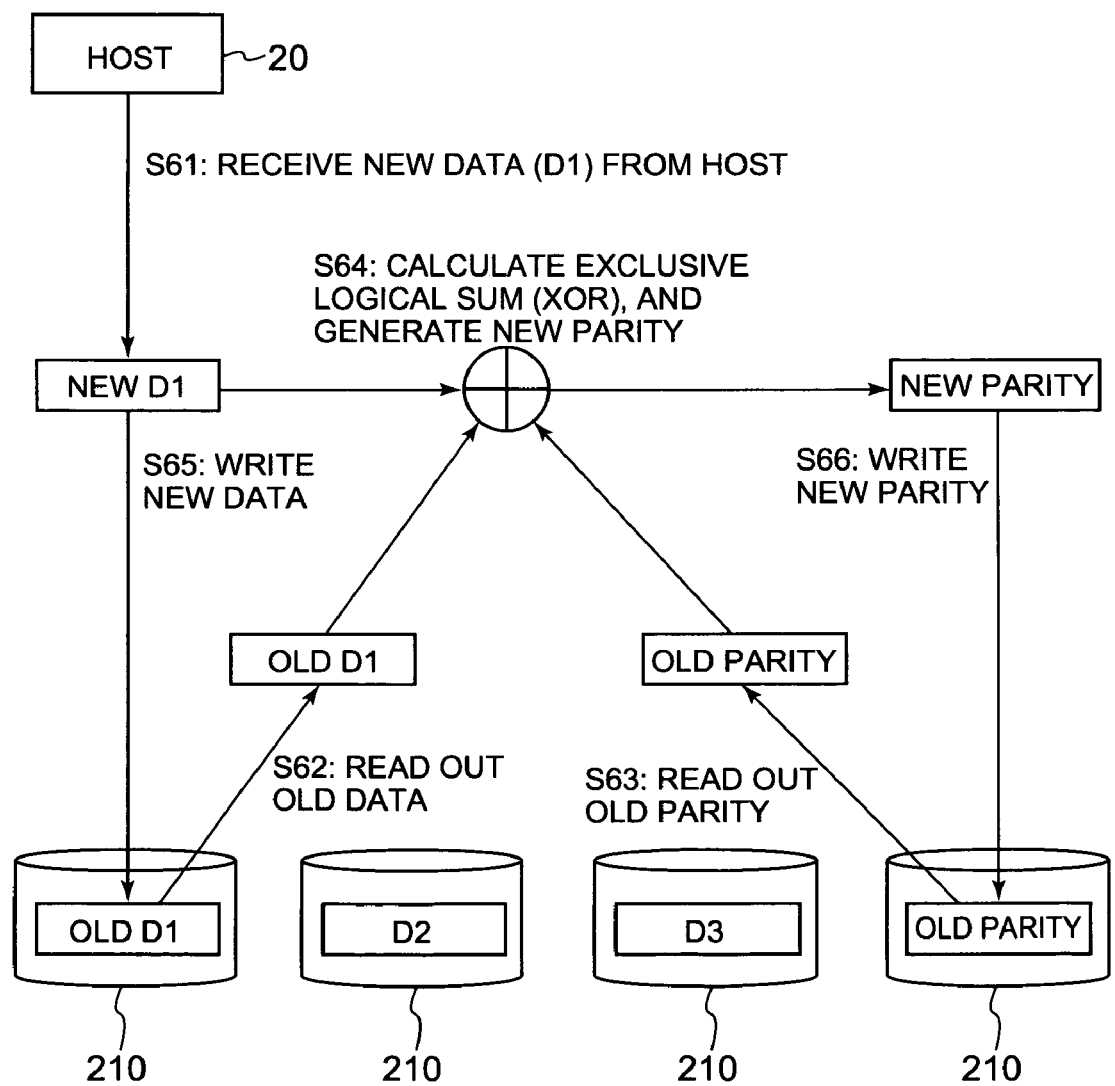
FIG. 13 is an explanatory figure showing an overall summary of write processing according to a second embodiment of the present invention.

FIG. 13 is an explanatory figure, schematically showing a summary of the case of writing the write data and the redundant data (the parity data) into an LU 220 which is structured according to RAID5. In the example shown in FIG. 13, an "old parity" of the redundant data is calculated by calculating the exclusive logical sum of data D1 through D3. In the following explanation, the redundant data will sometimes be abbreviated as "parity".

If a write command which has been issued from the host 20 is one which commands updating of all the data D1 through D3, then the controller 100 is able to generate a new parity, based only on the new data (the new D1 through the new D3) which it newly receives.

By contrast if, among the data D1 through D3 related to the generation of the parity, the host 20 only requests updating for a portion of the data, then reading out and processing of the old data, processing for generating the new parity, and write processing of the new data and the new parity are performed.

In other words, when the controller 100 receives the new data D1 from the host 20 (in a step S61), in order to calculate the new parity, it reads out the old data D1 which is to be updated with the new data D1 from the disk drive 210 (in a step S62). In the same manner, in order to calculate the new parity, the controller 100 reads out the old parity from another disk drive 210 (in a step S63).

And the controller 100 generates the new parity (in a step S64) by calculating an exclusive logical sum using the new data D1, the old data D1, and the old parity. After having generated this new parity, the controller 100 writes the new data D1 into the disk drive 210 (in a step S65), and furthermore writes the new parity into the other disk drive 210 (in a step S66).

(2) An Example of Write Processing Accompanying Block Size Conversion

Figure 14:
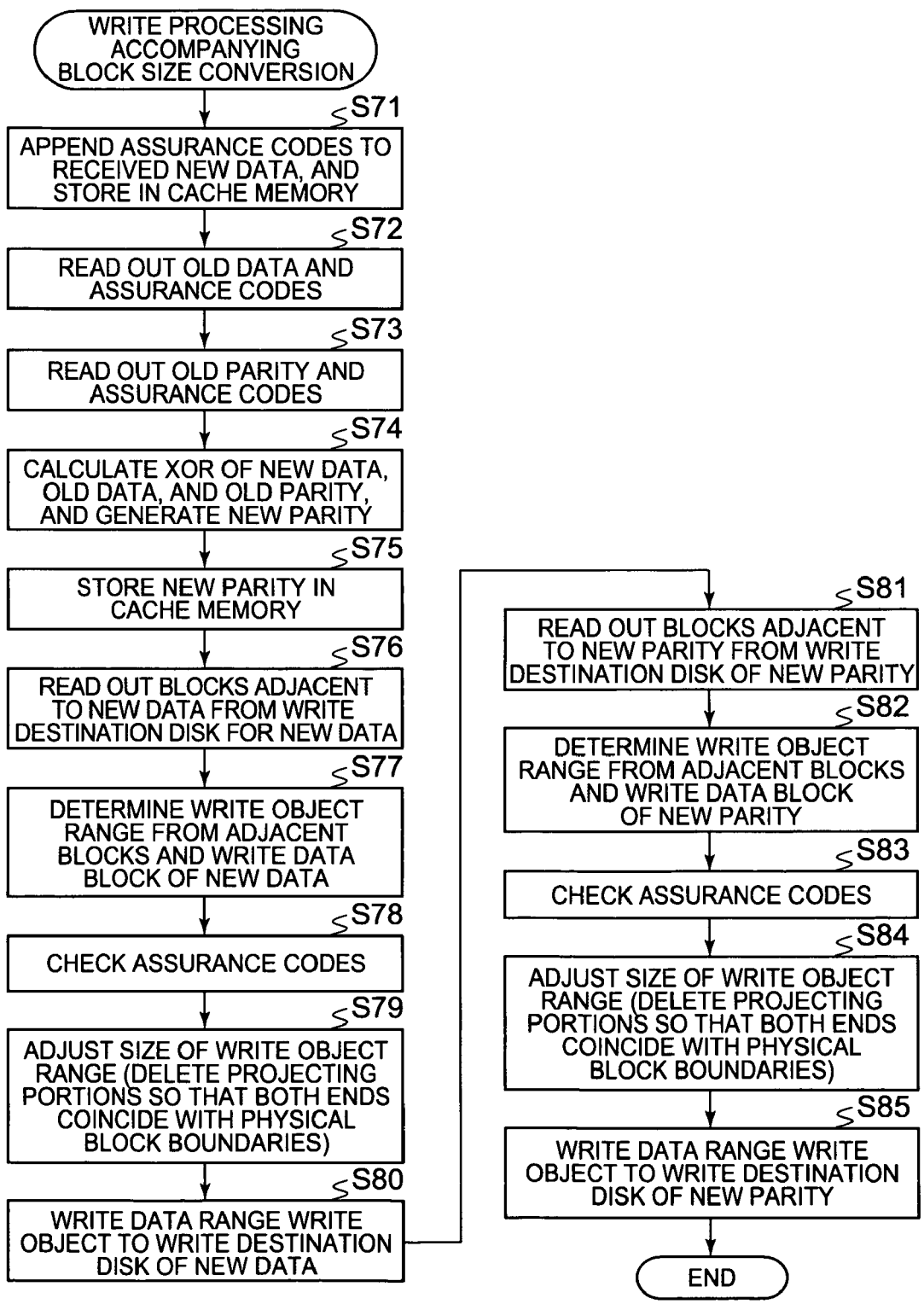
FIG. 14 is a flow chart showing the flow of write processing which accompanies block size conversion.

FIG. 14 is a flow chart showing the case when, in write processing of write data in an LU 220 of the above described RAID5 structure, appending of assurance codes 320 and adjustment of the block sizes is performed as described in connection with the first embodiment. It should be understood that, for the convenience of explanation, in FIG. 14, the explanation all relates to a single flow chart.

The controller 100 appends assurance codes to the new data which has been received from the host 20, and stores it in a cache memory 140 (in a step S71). This appending of assurance codes is performed, for each logical block, by an assurance code appending and deletion circuit 111 within a cache controller 110. By an assurance code being appended to the new data, a write data block 301 is generated.

The controller 100 reads out the old data and assurance codes which correspond to the new data from the disk drive 210 (in a step S72). In other words, the controller 100 reads out from the disk drive 210 the plurality of physical blocks 400 in which the old data and assurance codes are stored, extracts only the old data and assurance codes from among the data of these physical blocks 400 which have been read out, and stores them in the cache memory 140.

In the same manner, the controller 100 reads out the old parity and assurance codes from the disk drive 210 and stores them in the cache memory 140 (in a step S73). In a step S74 the controller 100 calculates a new parity from the new data and the old data and the old parity, using the redundant data generation circuit 113. This new parity which has thus been calculated is stored in the cache memory 140 (in a step S75). Assurance codes are also set for this new parity.

Next, the controller 100 reads out the blocks 302 which are adjacent to the new data from the disk drive 210 which is the write destination for the new data, and stores them in the cache memory 140 (in a step S76). It should be understood that, as has been explained above with reference to the first embodiment, this embodiment is not limited to reading out both of the two adjacent blocks 302F and 302B. If an end portion of the new data coincides with a physical block boundary B2, then the block 302 which is adjacent to this end portion is not read out.

The controller 100 then determines (in a step S77) the write object range, based on the write data block 301 which includes the new data and the adjacent block or blocks 302. And the controller 100 checks (in a step S78) the storage destination and the stored contents of this data range write object, using the assurance codes which are included in the write object range.

If the result of this checking is normal, then the controller 100 adjusts the size of the write object range (in a step S79) so that both ends of the write object range coincide with physical block boundaries B2, by deleting the portions of the data which project over the physical block boundaries B2. The controller 100 then writes (in a step S80) this data range write object, which has been adjusted to a size which is an integral multiple of the size of the physical blocks 400, to the disk drive 210.

Next, the controller 100 performs (in steps S81 through S85) the same processing as described above for the new data, for the new parity as well. In other words, the controller 100 reads out (in a step S81) the blocks 302 which are adjacent to the new parity from the write destination disk drive 210 of the new parity. And the controller 100 determines (in a step S82) the write object range by linking the new parity and its assurance code with the data of the adjacent blocks 302, and checks (in a step S83) the data range write object using the assurance code which is included in the write object range. It should be understood that, if the headmost end or the final end of the block which includes the new parity and its assurance code coincides with a physical block boundary B2, then the block 302 which is adjacent to this coincident end portion is not read out.

If the result of this checking is normal, then the controller 100 adjusts the size of the write object range so that it becomes an integral multiple of the size of the physical blocks 400 (in a step S84) by deleting superfluous data from the adjacent blocks 302 which are included in the write object range. The controller 100 then writes the resulting data range write object onto the disk drive 210 (in a step S85).

Figure 15:
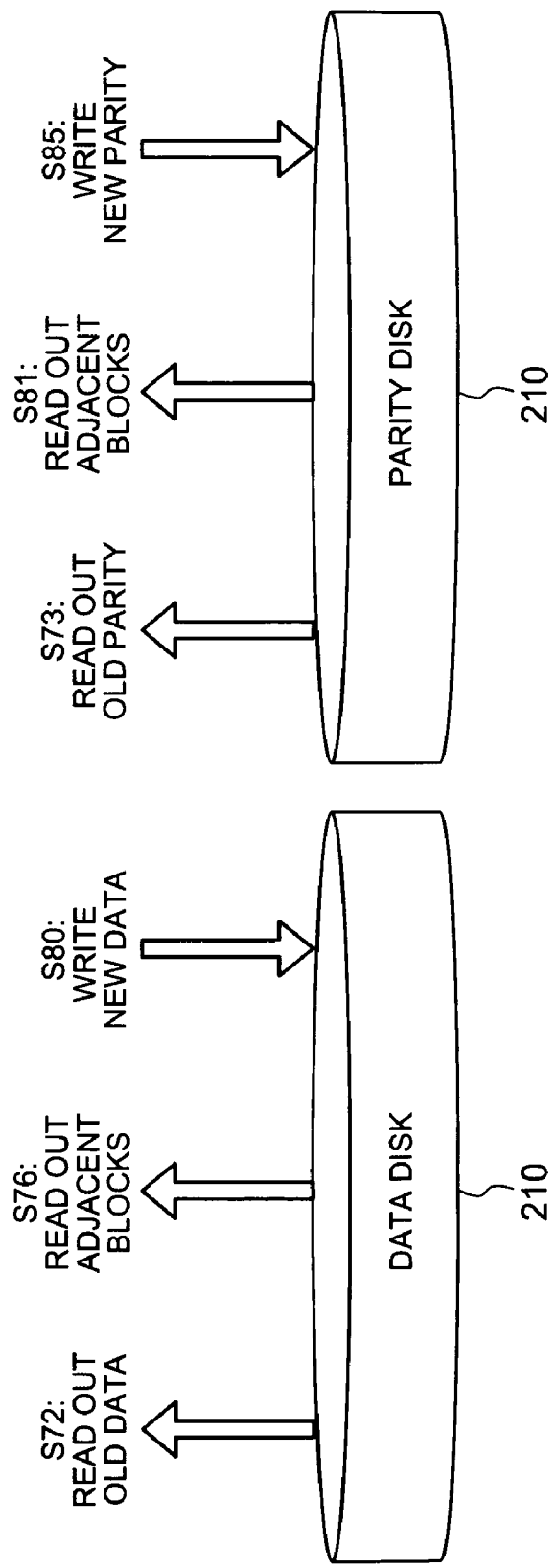
FIG. 15 is an explanatory figure schematically showing a state of access to a disk drive.

FIG. 15 is a schematic figure showing a situation in which the controller 100 accesses the disk drive 210 when performing write processing. The disk drive 210 on which the data is stored will be termed the data disk, while the disk on which the parity is stored will be termed the parity disk. It should be understood that, in the case of RAID5, the parity is not only stored on a specified disk drive; it is stored by being dispersed in order over several disk drives.

The access by the controller 100 to the data disk will first be described. When writing write data to the LU 220 in the RAID5 structure, the controller 100 reads out the old data and the adjacent blocks 302 from the data disk by individually different accesses (in steps S72 and S76), and writes on the data disk (in a step S80) the new data (in more detail, a data range write object which includes the new data). Accordingly, two read accesses and one write access are performed to the data disk.

Now to give attention to the access by the controller 100 to the parity disk, the controller 100 reads out the old parity and the adjacent blocks 302 from the data disk by individually different accesses (in steps S73 and S81), and writes the new parity on the parity disk (in a step S85). More accurately, the controller 100 writes a data range write object which includes the new parity on the parity disk. Accordingly, two read accesses and one write access are performed to the parity disk as well.

Embodiment 3

A third embodiment of the present invention will now be explained with reference to FIGS. 16 and 17. In this third embodiment, when reading out the old data and so on from the disk drive 210, the number of accesses to the disk drive 210 by the controller 100 is reduced by reading out the adjacent blocks 302 together.

In the second embodiment, as shown in FIG. 15, three accesses were made to each one of the data disk and the parity disk, so that it was necessary to perform a total of six accesses. Accordingly, with the second embodiment described above, there is a possibility that the responsiveness of the storage system 10 may be deteriorated.

Thus, in this third embodiment, the number of read accesses is reduced by appropriately planning the read out timing of the adjacent blocks 302. FIG. 16 is a flow chart showing the flow of processing for the write processing accompanying block size conversion, in this third embodiment of the present invention.

In this flow chart, steps S71, S74, S75, S77 through S80, and S82 through S85 are provided which are the same as those of the flow chart shown in FIG. 14. In other words, in this flow chart of FIG. 16, the steps S76 and S81 in the FIG. 14 flow chart are not provided.

Figure 16:
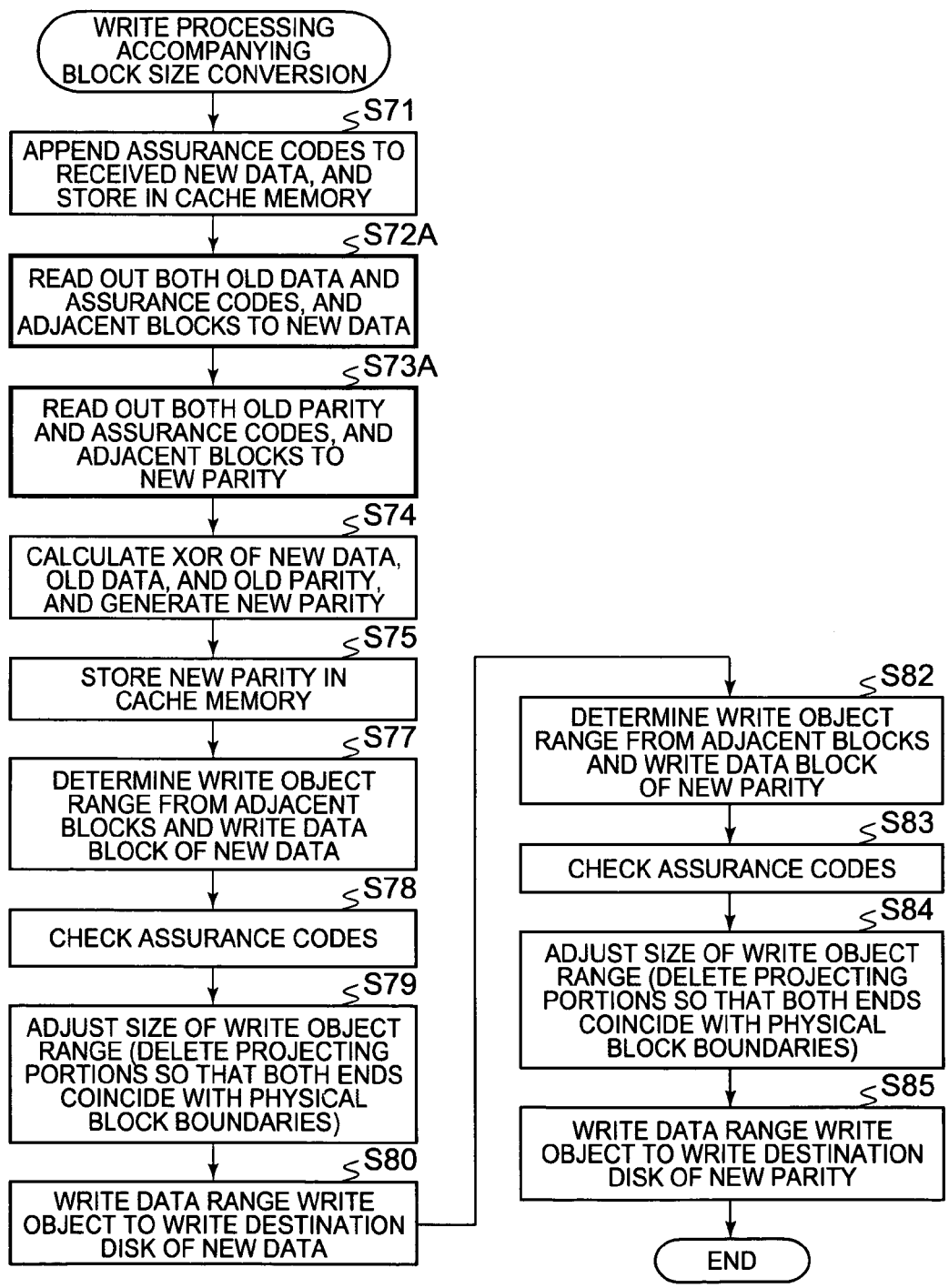
FIG. 16 is a flow chart showing the flow of write processing according to a third embodiment of the present invention.
Figure 17:
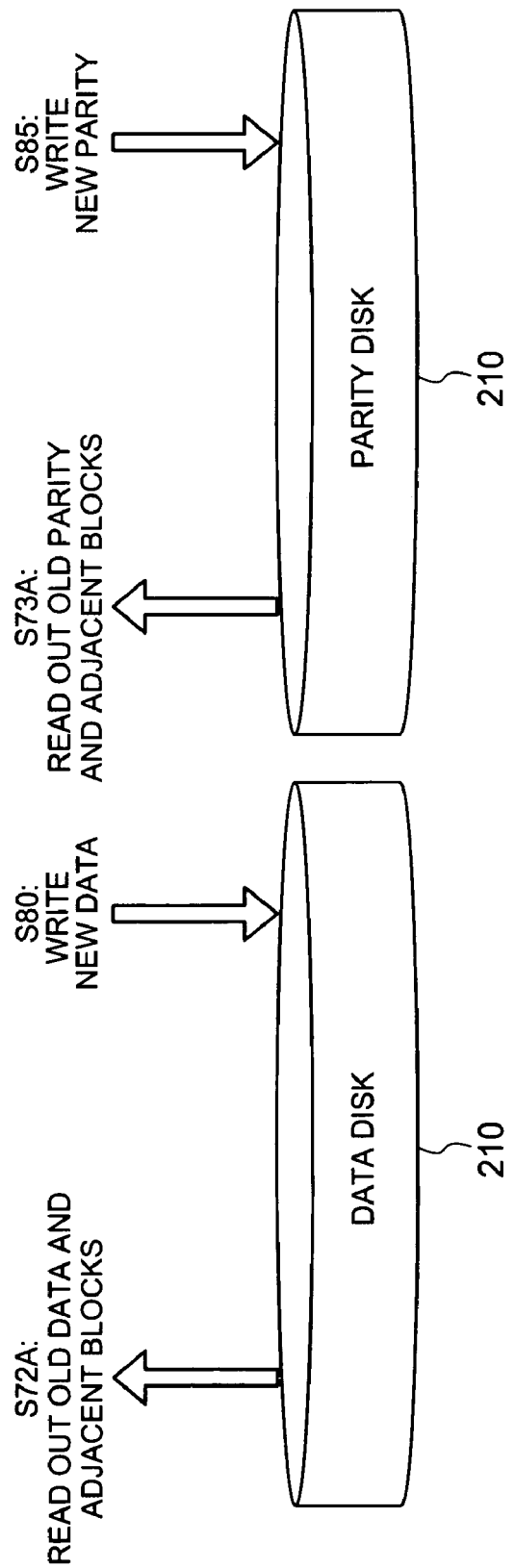
FIG. 17 is an explanatory figure schematically showing a state of access to a disk drive.

In the flow chart shown in FIG. 16, when reading out the old data and its assurance codes from the disk drive 210, the controller 100 reads out (in a step S72A) the blocks 302 which are adjacent to the old data and its assurance codes together therewith.

Since the old data and its assurance codes are the same size as the new data and its assurance codes, its adjacent blocks 302 are also the blocks which are adjacent to the new data and its assurance codes (in other words, the write data block 301).

In the same manner, when reading out the old parity and its assurance codes from the disk drive 210, the controller 100 reads out (in a step S73A) the blocks 302 which are adjacent to the old parity and its assurance codes together therewith.

As a result, in this third embodiment of the present invention, it is not necessary to read out the adjacent blocks 302 related to the write data and to the parity with separate read accesses. Accordingly, as shown in the schematic figure of FIG. 17, it is possible to reduce the number of accesses to the disk drives 210 by the controller 100 to a total of four.

Thus, in this third embodiment, it is possible, without increasing the number of disk accesses, to input and output data efficiently between blocks which are of different sizes, and furthermore it is possible to maintain the reliability which is provided by the use of assurance codes.

Embodiment 4

Figure 18:
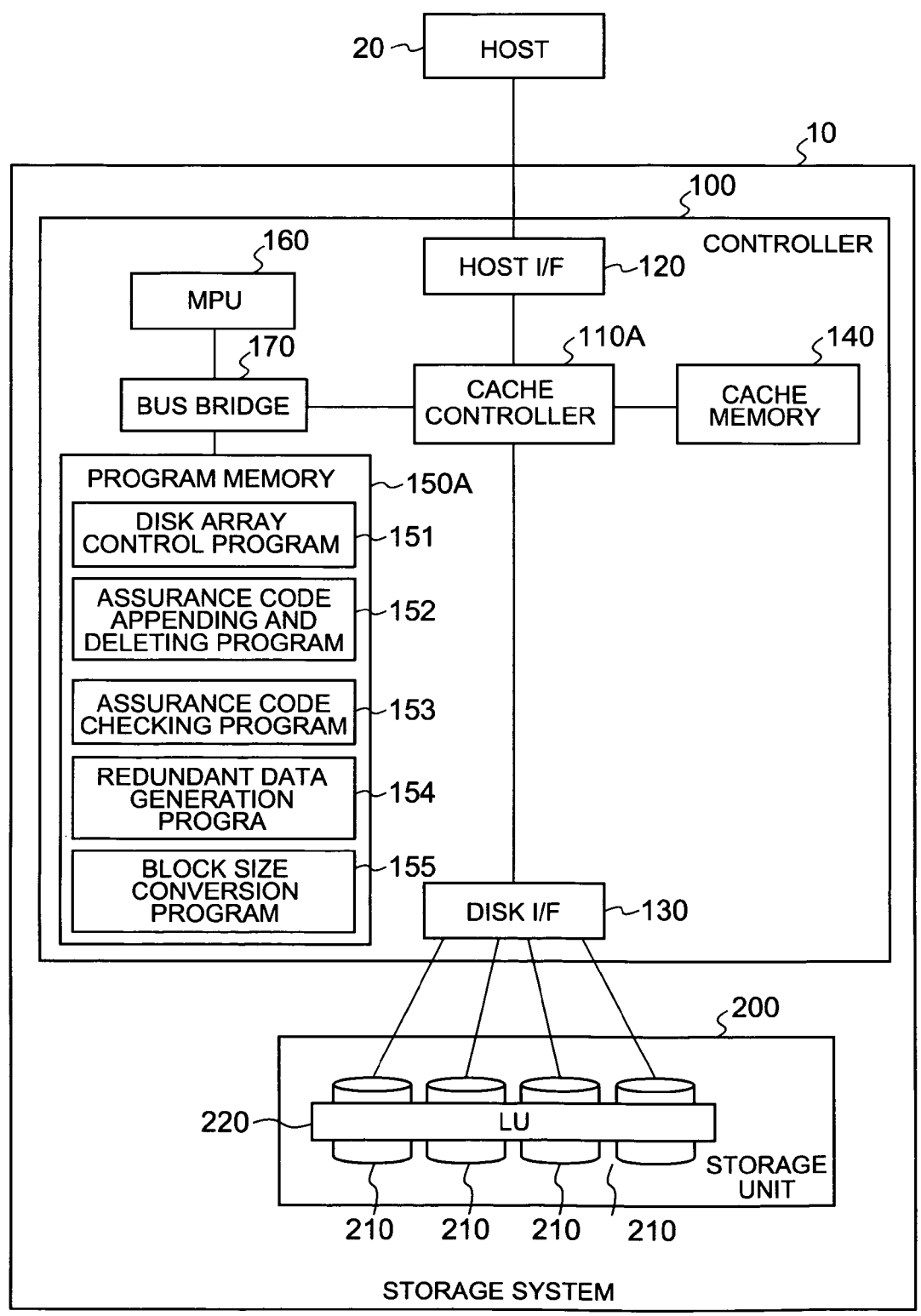
FIG. 18 is a block diagram showing the structure of a storage system according to a fourth embodiment of the present invention.

FIG. 18 is a block diagram of a storage system 10 according to a fourth embodiment of the present invention. In this fourth embodiment, an assurance code appending and deleting program 152, an assurance code checking program 153, a redundant data generation program 154, and a block size conversion program 155 are all stored in a program memory 150A.

The assurance code appending and deleting program 152 is a program for causing the MPU 160 to implement the functions of the assurance code appending and deletion circuit 111 described above in connection with the first embodiment. And furthermore, in the same manner, the assurance code checking program 153 is a program for causing the MPU 160 to implement the functions of the assurance code checking circuit 112, the redundant data generation program 154 is a program for causing the MPU 160 to implement the functions of the redundant data generation circuit 113, and the block size conversion program 155 is a program for causing the MPU 160 to implement the functions of the block size conversion circuit 114.

In this manner, it is also possible for the MPU 160 to handle the assurance codes, and to perform conversion of the block sizes and the like.

It should be understood that the present invention is not to be considered as being limited by the above described embodiments. It would be possible for a person of ordinary skill in the art to make various additions and changes and the like to the present invention, without departing from its range.

For example although, in the above description, RAID5 has been cited as an example of a RAID structure which employs redundant data, the present invention is not to be considered as being limited thereby; it could also be applied to some other type of RAID structure, such as RAID6 or the like.

Moreover, in the above explanation, the functions of appending the assurance codes and converting the block sizes and so on were described as being implemented entirely by hardware circuitry in the cache controller 110, or alternatively as being implemented entirely by computer programs. However, the present invention is not to be considered as being limited by the above descriptions; it would also be acceptable to arrange to implement a part of these functions by hardware circuitry, and to implement the remainder of these functions by computer programs.

Yet further although, in the various embodiments disclosed, the example was cited of an ATA disk in which the physical block size was fixed, the present invention is not to be considered as being limited to the case of such an ATA disk; it could also be applied to various other types of disk drives. The present invention may be applied to any case in which the units of data handled by the disk drives and the units of data handled by the controller are different from one another.

What is claimed is:

1. A storage control device for controlling data input and output between a host device and a storage device, wherein
said storage control device receiving write data having size of integer multiple of a first block unit and storing the write data in the storage device having storage location of second block units, wherein the size of the first block unit which is used in data input and output processing within the storage control device, and the size of the second blocks which is provided within the storage device, are different from one another,
the storage control device comprising:
a linked data generation unit which generates linked data by, if either one end or the other end of the write data does not coincide with a boundary between two successive second blocks, acquiring a previously stored data and linking the previously stored data to the end of the write data which does not coincide with the boundary to thereby define linked data;
a data size adjustment unit which adjusts the size of the linked data to an integral multiple of the size of the second block units by deleting a portion of the previously stored data that was linked, so that the end portion of the previously stored data which has been linked to the write data coincides with the boundary; and
a writing unit which writes the linked data whose size has been adjusted into the storage device.

2. A storage control device for controlling data input and output between a host device and a storage device, wherein
the size of a first block which is used in data input and output processing within the storage control device, and the size of a plurality of second blocks which are provided within the storage device, are different from one another,
the storage control device comprising:
a write data reception unit which, according to a request from the host device, receives write data from the host device;
a reading out unit which reads out data from the storage device;
an assurance code setting unit which, for the write data which has been received, converts the write data to write data in the first block units by setting a respective assurance code for guaranteeing data contents, for each item of data of the size of the second blocks;
a cache memory which stores the write data in the first block units;
a linked data generation unit which generates linked data by, if either one end or the other end of the write data stored in the cache memory does not coincide with a boundary between the second blocks, acquiring from the storage device via the reading out unit the data of another first block which is contiguous with the non-coincident end portion and linking the data of the other first block which has been acquired to the write data;

a checking unit which checks whether or not the contents of the linked data are normal, based on the assurance codes which are included in the linked data;

a data size adjustment unit which, if a check result of normality has been obtained by the checking unit, adjusts the size of the linked data to an integral multiple of the second size by deleting a portion of the data of the other first block, so that the end portion of the data of the other first block which has been linked to the write data coincides with a boundary between the second blocks; and a writing unit which writes the linked data whose size has been adjusted into the storage device.

3. The storage control device according to claim 2, wherein a redundant storage structure which uses redundant data is provided by the storage device, the storage control device further comprising a redundant data generation unit which generates redundant data in the first block units with regard to the write data which has been received, and wherein the linked data generation unit, the checking unit, the data size adjustment unit, and the writing unit process the redundant data in the same manner as the write data.

4. The storage control device according to claim 2, wherein a redundant storage structure which uses redundant data is provided by the storage device, the storage control device further comprising a redundant data generation unit which generates redundant data in the first block units with regard to the write data which has been received, and wherein the linked data generation unit, the checking unit, the data size adjustment unit, and the writing unit process the redundant data in the same manner as the write data, and the reading out unit is formed to read out data from the storage device of a size which is the least common multiple of the size of the first block and the size of the second blocks.

5. The storage control device according to claim 2, wherein a redundant storage structure which uses redundant data is provided by the storage device, the storage control device further comprising a redundant data generation unit which generates redundant data in the first block units with regard to the write data which has been received, and wherein the linked data generation unit, the checking unit, the data size adjustment unit, and the writing unit process the redundant data in the same manner as the write data, the storage control device further comprising:

an old data reading out unit which, before the linked data generation unit generates the linked data, reads out in advance from the storage device each of the old data, in the first block units, which is updated by the write data and another first block data which is contiguous to the old data, and stores the data in the cache memory; and an old redundant data reading out unit which, before the linked data generation unit generates the linked data related to the new redundant data, reads out in advance from the storage device each of the old redundant data, in the first block units, which is updated by the new redundant data and another first block data which is contiguous to the old redundant data, and stores the data in the cache memory.

6. The storage control device according to claim 2, further comprising a cache controller which controls data input and output to and from the cache memory, wherein the assurance code setting unit, the checking unit, and the data size adjustment unit are provided within the cache controller respectively.

7. The storage control device according to claim 2, further comprising a micro processor which controls data input and output processing, wherein the assurance code setting unit, the checking unit, the linked data generation unit, and the data size adjustment unit are implemented by the micro processor respectively.

8. The storage control device according to claim 2, wherein, an error detection symbol for detecting an error, for each second sized data item, is included in the assurance code.

9. The storage control device according to claim 2, wherein, address information for detecting an error of an write address, for each second sized data item, is included in the assurance code.

10. The storage control device according claim 2, wherein, an error detection symbol for detecting an error, for each second sized data item, and address information for detecting an error of the write address, for each second sized data item, are included in the assurance code.

11. A method for controlling a storage control device which performs data input and output between a host device and a storage device, wherein the size of a first block which is used in data input and output processing within the storage control device, and the size of a plurality of second blocks which are provided within the storage device, are different from one another, the control device executing:

a write data reception step of storing write data which has been received from the host device in a cache memory;

an adjacent block acquisition step of deciding whether or not either one end or the other end of the write data which has been stored in the cache memory does not coincide with a boundary between the second blocks, and, if not coincided, acquiring from the storage device the data of another first block which is adjacent to and contiguous to the non-coincident end portion;

a linked data generation step of generating linked data by linking the adjacent block which has been acquired to the write data;

a data size adjustment step of adjusting the size of the linked data to an integral multiple of the second size by deleting a portion of the data of the other first block, so that the end portion of the data of the other first block which has been linked to the write data coincides with a boundary between the second blocks; and a writing step of writing the linked data whose size has been adjusted into the storage device.

12. The control method for a storage control device according to claim 11, further comprising an assurance code setting step between the write data reception step and the adjacent block acquisition step, and a checking step between the linked data generation step and the data size adjustment step, wherein in the assurance code setting step, for the write data which has been received, the write data is converted to write data in the first block units by setting a respective assurance code for guaranteeing data contents for each item of data of the size of the second block; and in the checking step, whether or not the contents of the linked data are normal is checked, based on the assurance codes which are included in the linked data.

* * * * *